United States Patent
Tang et al.

(10) Patent No.: US 10,437,015 B2
(45) Date of Patent: Oct. 8, 2019

(54) OPTICAL IMAGING LENS

(71) Applicant: GENIUS ELECTRONIC OPTICAL CO., LTD., Taichung (TW)

(72) Inventors: Tzu Chien Tang, Taichung (TW); Pei Chi Wang, Taichung (TW)

(73) Assignee: GENIUS ELECTRONIC OPTICAL CO., LTD., Taichung (TW)

(*) Notice: Subject to any disclaimer, the term of this patent is extended or adjusted under 35 U.S.C. 154(b) by 0 days.

(21) Appl. No.: 15/248,447

(22) Filed: Aug. 26, 2016

(65) Prior Publication Data
US 2018/0017765 A1    Jan. 18, 2018

(30) Foreign Application Priority Data
Jul. 14, 2016  (CN) .......................... 2016 1 05530249

(51) Int. Cl.
| G11C 7/10 | (2006.01) |
|---|---|
| G02B 13/00 | (2006.01) |
| G02B 1/04 | (2006.01) |
| G02B 5/00 | (2006.01) |
| G02B 5/20 | (2006.01) |
| G02B 9/60 | (2006.01) |
| G02B 27/00 | (2006.01) |
| G02B 9/34 | (2006.01) |
| G02B 13/06 | (2006.01) |

(52) U.S. Cl.
CPC ......... *G02B 13/0045* (2013.01); *G02B 1/041* (2013.01); *G02B 5/005* (2013.01); *G02B 5/208* (2013.01); *G02B 9/34* (2013.01); *G02B 9/60* (2013.01); *G02B 13/006* (2013.01); *G02B 13/06* (2013.01); *G02B 27/0025* (2013.01)

(58) Field of Classification Search
CPC .... G02B 13/0045; G02B 1/041; G02B 5/005; G02B 5/208; G02B 9/60; G02B 27/0025
USPC ................................. 359/714, 753, 763, 770
See application file for complete search history.

(56) References Cited

U.S. PATENT DOCUMENTS

| 8,134,787 | B2 | 3/2012 | Saitoh |
| 8,654,458 | B2 | 2/2014 | Tsai et al. |
| 9,274,307 | B2 | 3/2016 | Lee et al. |
| 9,304,290 | B2 | 4/2016 | Lee et al. |
| 2008/0130128 | A1 | 6/2008 | Yamashita et al. |
| 2013/0107376 | A1* | 5/2013 | Tsai ................... G02B 13/0045 359/714 |

(Continued)

FOREIGN PATENT DOCUMENTS

| CN | 102466858 | 4/2014 |
| TW | I484211 | 5/2015 |

OTHER PUBLICATIONS

Stemmer, Michael; Extended European Search Report on European Patent Application No. EP 17180691.2; dated May 23, 2018; 7 pages.

*Primary Examiner* — Joseph P Martinez
(74) *Attorney, Agent, or Firm* — Huffman Law Group, PC; James W. Huffman

(57) ABSTRACT

Present embodiments provide for optical imaging lenses. An optical imaging lens may include five lens elements positioned sequentially from an object side to an image side. By controlling the convex or concave shape of the surfaces of the lens elements and designing parameters satisfying at least one inequality, the optical imaging lens may exhibit better optical characteristics and the total length of the optical imaging lens may be shortened.

21 Claims, 40 Drawing Sheets

(56) References Cited

U.S. PATENT DOCUMENTS

| | | | |
|---|---|---|---|
| 2015/0168676 A1* | 6/2015 | Lee .......................... | G02B 9/60 |
| | | | 348/374 |
| 2015/0168684 A1* | 6/2015 | Lee ................... | G02B 13/0045 |
| | | | 359/763 |
| 2015/0185445 A1* | 7/2015 | Ahn ................... | G02B 13/0045 |
| | | | 359/753 |

* cited by examiner

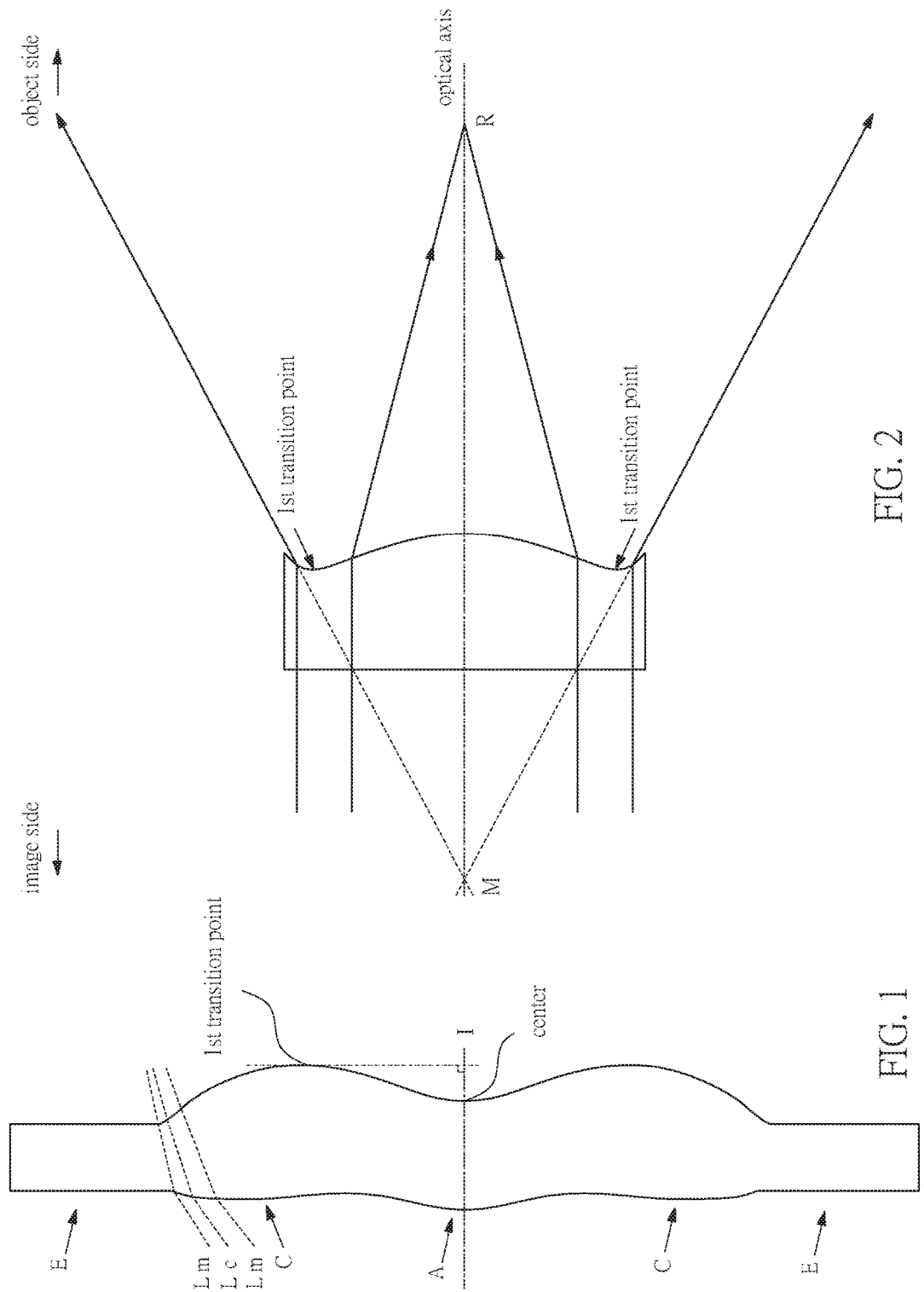

| EFL (Effective focus length) = 0.864mm, HFOV (Half angular field of view) = 103.5deg., TTL (System length) = 11.634mm, Image height = 1.362mm, Fno = 2.2 | | | | | | | |
|---|---|---|---|---|---|---|---|
| Surface # | | Radius (mm) | Thickness (mm) | Refractive index | Abbe number | Focus (mm) | Material |
| - | Object | ∞ | 300 | | | | |
| 111 | 1st lens element | 11.3549 | 1.3000_T1 | 1.591_n1 | 61.242_v1 | -4.339_f1 | plastic |
| 112 | | 2.0027 | 2.1501_G1 | | | | |
| 121 | 2nd lens lement | 8.9466 | 0.9000_T2 | 1.514_n2 | 56.264_v2 | -2.315_f2 | plastic |
| 122 | | 1.0138 | 0.6825_G2 | | | | |
| 131 | 3rd lens element | -5.2952 | 1.5778_T3 | 1.586_n3 | 30.181_v3 | 2.234_f3 | plastic |
| 132 | | -1.1653 | 0.0128_G3-TA | | | | |
| 100 | Aperture stop | ∞ | 0.1380_TA | | | | |
| 141 | 4th lens element | 3.1900 | 0.7300_T4 | 1.640_n4 | 23.899_v4 | -4225.904_f4 | plastic |
| 142 | | 0.4842 | 0.0000_G4 | | | | |
| 151 | 5th lens element | 0.4842 | 2.2497_T5 | 1.533_n5 | 55.904_v5 | 5.200_f5 | plastic |
| 152 | | -1.7084 | 0.6927_G5F | | | | |
| 161 | IR cut filter | ∞ | 0.7000_TF | | | | |
| 162 | | ∞ | 0.5000_GFP | | | | |
| 170 | Image plane | ∞ | | | | | |

FIG. 8

| Aspherical parameters | | | | | |
|---|---|---|---|---|---|
| Surface# | K | $a_4$ | $a_6$ | $a_8$ | $a_{10}$ |
| 111 | 0.000000E+00 | 0.000000E+00 | 0.000000E+00 | 0.000000E+00 | 0.000000E+00 |
| 112 | 0.000000E+00 | 0.000000E+00 | 0.000000E+00 | 0.000000E+00 | 0.000000E+00 |
| 121 | 0.000000E+00 | -1.237715E-02 | 3.122513E-03 | -3.027629E-04 | 0.000000E+00 |
| 122 | 0.000000E+00 | -5.179862E-02 | 1.040196E-01 | 5.019197E-01 | 0.000000E+00 |
| 131 | 0.000000E+00 | -5.368853E-02 | 8.566445E-02 | -5.880406E-02 | 0.000000E+00 |
| 132 | 0.000000E+00 | 1.608197E-01 | -1.086643E-01 | 8.756440E-02 | 0.000000E+00 |
| 141 | 0.000000E+00 | 6.004373E-02 | -1.661596E-01 | 2.233754E-01 | -1.028891E-01 |
| 142 | -1.000000E+00 | -5.424557E-01 | 5.583721E-01 | -3.583051E-01 | 1.179158E-01 |
| 151 | -1.000000E+00 | -5.424557E-01 | 5.583721E-01 | -3.583051E-01 | 1.179158E-01 |
| 152 | 0.000000E+00 | 5.180866E-02 | 2.752935E-03 | 4.229644E-03 | -1.459691E-03 |
| Surface# | $a_{12}$ | $a_{14}$ | $a_{16}$ | $a_{18}$ | $a_{20}$ |
| 111 | 0.000000E+00 | 0.000000E+00 | 0.000000E+00 | 0.000000E+00 | 0.000000E+00 |
| 112 | 0.000000E+00 | 0.000000E+00 | 0.000000E+00 | 0.000000E+00 | 0.000000E+00 |
| 121 | 0.000000E+00 | 0.000000E+00 | 0.000000E+00 | 0.000000E+00 | 0.000000E+00 |
| 122 | 0.000000E+00 | 0.000000E+00 | 0.000000E+00 | 0.000000E+00 | 0.000000E+00 |
| 131 | 0.000000E+00 | 0.000000E+00 | 0.000000E+00 | 0.000000E+00 | 0.000000E+00 |
| 132 | 0.000000E+00 | 0.000000E+00 | 0.000000E+00 | 0.000000E+00 | 0.000000E+00 |
| 141 | 0.000000E+00 | 0.000000E+00 | 0.000000E+00 | 0.000000E+00 | 0.000000E+00 |
| 142 | 0.000000E+00 | 0.000000E+00 | 0.000000E+00 | 0.000000E+00 | 0.000000E+00 |
| 151 | 0.000000E+00 | 0.000000E+00 | 0.000000E+00 | 0.000000E+00 | 0.000000E+00 |
| 152 | 0.000000E+00 | 0.000000E+00 | 0.000000E+00 | 0.000000E+00 | 0.000000E+00 |

FIG. 9

| EFL (Effective focus length) = 0.874mm, HFOV (Half angular field of view) = 103.5deg., TTL (System length) = 12.441mm, Image height = 1.495mm, Fno = 2.2 |||||||
|---|---|---|---|---|---|---|---|
| Surface # | | Radius (mm) | Thickness (mm) | Refractive index | Abbe number | Focus (mm) | Material |
| - | Object | ∞ | 300 | | | | |
| 211 | 1st lens element | 14.0143 | 1.4261_T1 | 1.591_n1 | 61.242_v1 | -5.384_f1 | plastic |
| 212 | | 2.4949 | 2.1288_G1 | | | | |
| 221 | 2nd lens lement | 7.8179 | 1.1058_T2 | 1.514_n2 | 56.264_v2 | -2.574_f2 | plastic |
| 222 | | 1.0766 | 0.8793_G2 | | | | |
| 231 | 3rd lens element | -3.9206 | 1.7772_T3 | 1.586_n3 | 30.181_v3 | 2.357_f3 | plastic |
| 232 | | -1.1926 | 0.1500_G3-TA | | | | |
| 200 | Aperture stop | ∞ | 0.0345_TA | | | | |
| 241 | 4th lens element | 3.0451 | 0.7023_T4 | 1.640_n4 | 23.899_v4 | -317.383_f4 | plastic |
| 242 | | 0.4523 | 0.0000_G4 | | | | |
| 251 | 5th lens element | 0.4523 | 2.4381_T5 | 1.533_n5 | 55.904_v5 | 5.109_f5 | plastic |
| 252 | | -1.6973 | 0.5988_G5F | | | | |
| 261 | IR cut filter | ∞ | 0.7000_TF | | | | |
| 262 | | ∞ | 0.5000_GFP | | | | |
| 270 | Image plane | ∞ | | | | | |

FIG. 12

| Aspherical parameters | | | | | |
|---|---|---|---|---|---|
| Surface# | K | $a_4$ | $a_6$ | $a_8$ | $a_{10}$ |
| 211 | 0.000000E+00 | 0.000000E+00 | 0.000000E+00 | 0.000000E+00 | 0.000000E+00 |
| 212 | 0.000000E+00 | 0.000000E+00 | 0.000000E+00 | 0.000000E+00 | 0.000000E+00 |
| 221 | 0.000000E+00 | -5.892419E-03 | 6.637495E-04 | 5.721942E-05 | 0.000000E+00 |
| 222 | 0.000000E+00 | -8.395118E-02 | 8.680312E-03 | -3.848572E-02 | 0.000000E+00 |
| 231 | 0.000000E+00 | -9.754280E-02 | 2.758846E-02 | -6.872233E-02 | 0.000000E+00 |
| 232 | 0.000000E+00 | 1.631019E-01 | -1.053141E-01 | 8.601901E-02 | 0.000000E+00 |
| 241 | 0.000000E+00 | 3.819378E-02 | -4.967710E-02 | 3.526611E-02 | 5.341163E-03 |
| 242 | -1.000000E+00 | -5.836180E-01 | 8.883315E-01 | -7.374299E-01 | 2.703963E-01 |
| 251 | -1.000000E+00 | -5.836180E-01 | 8.883315E-01 | -7.374299E-01 | 2.703963E-01 |
| 252 | 0.000000E+00 | 6.635943E-02 | -9.290589E-03 | 3.615671E-03 | -8.402906E-04 |
| Surface# | $a_{12}$ | $a_{14}$ | $a_{16}$ | $a_{18}$ | $a_{20}$ |
| 211 | 0.000000E+00 | 0.000000E+00 | 0.000000E+00 | 0.000000E+00 | 0.000000E+00 |
| 212 | 0.000000E+00 | 0.000000E+00 | 0.000000E+00 | 0.000000E+00 | 0.000000E+00 |
| 221 | 0.000000E+00 | 0.000000E+00 | 0.000000E+00 | 0.000000E+00 | 0.000000E+00 |
| 222 | 0.000000E+00 | 0.000000E+00 | 0.000000E+00 | 0.000000E+00 | 0.000000E+00 |
| 231 | 0.000000E+00 | 0.000000E+00 | 0.000000E+00 | 0.000000E+00 | 0.000000E+00 |
| 232 | 0.000000E+00 | 0.000000E+00 | 0.000000E+00 | 0.000000E+00 | 0.000000E+00 |
| 241 | 0.000000E+00 | 0.000000E+00 | 0.000000E+00 | 0.000000E+00 | 0.000000E+00 |
| 242 | 0.000000E+00 | 0.000000E+00 | 0.000000E+00 | 0.000000E+00 | 0.000000E+00 |
| 251 | 0.000000E+00 | 0.000000E+00 | 0.000000E+00 | 0.000000E+00 | 0.000000E+00 |
| 252 | 0.000000E+00 | 0.000000E+00 | 0.000000E+00 | 0.000000E+00 | 0.000000E+00 |

FIG. 13

| \multicolumn{7}{c}{EFL (Effective focus length) = 0.772 mm, HFOV (Half angular field of view) = 103.5deg.,} |
|---|---|---|---|---|---|---|
| \multicolumn{7}{c}{TTL (System length) = 11.802mm, Image height = 1.326mm, Fno = 2.2} |
| Surface # | | Radius (mm) | Thickness (mm) | Refractive index | Abbe number | Focus (mm) | Material |
| - | Object | ∞ | 300 | | | | |
| 311 | 1st lens element | 11.6892 | 1.7015_T1 | 1.591_n1 | 61.242_v1 | -5.353_f1 | plastic |
| 312 | | 2.3550 | 2.3513_G1 | | | | |
| 321 | 2nd lens lement | 13.7021 | 0.7854_T2 | 1.514_n2 | 56.264_v2 | -2.490_f2 | plastic |
| 322 | | 1.1471 | 0.9839_G2 | | | | |
| 331 | 3rd lens element | -3.8123 | 1.6956_T3 | 1.586_n3 | 30.181_v3 | 2.342_f3 | plastic |
| 332 | | -1.1751 | 0.1500_G3-TA | | | | |
| 300 | Aperture stop | ∞ | 0.1412_TA | | | | |
| 341 | 4th lens element | 3.1367 | 0.7161_T4 | 1.640_n4 | 23.899_v4 | -242.701_f4 | plastic |
| 342 | | 0.4628 | 0.0000_G4 | | | | |
| 351 | 5th lens element | 0.4628 | 1.3565_T5 | 1.533_n5 | 55.904_v5 | 6.987_f5 | plastic |
| 352 | | -1.7161 | 0.7205_G5F | | | | |
| 361 | IR cut filter | ∞ | 0.7000_TF | | | | |
| 362 | | ∞ | 0.5000_GFP | | | | |
| 370 | Image plane | ∞ | | | | | |

FIG. 16

| Aspherical parameters | | | | | |
|---|---|---|---|---|---|
| Surface# | K | $a_4$ | $a_6$ | $a_8$ | $a_{10}$ |
| 311 | 0.000000E+00 | 0.000000E+00 | 0.000000E+00 | 0.000000E+00 | 0.000000E+00 |
| 312 | 0.000000E+00 | 0.000000E+00 | 0.000000E+00 | 0.000000E+00 | 0.000000E+00 |
| 321 | 0.000000E+00 | -4.720389E-03 | 8.682652E-04 | -1.522063E-05 | 0.000000E+00 |
| 322 | 0.000000E+00 | -4.211189E-02 | -7.004735E-03 | -8.531686E-03 | 0.000000E+00 |
| 331 | 0.000000E+00 | -9.740911E-02 | 2.381487E-02 | -6.091431E-02 | 0.000000E+00 |
| 332 | 0.000000E+00 | 1.621090E-01 | -9.704526E-02 | 9.413961E-02 | 0.000000E+00 |
| 341 | 0.000000E+00 | 3.818623E-02 | -4.956566E-02 | 3.747572E-02 | -7.127724E-03 |
| 342 | -1.000000E+00 | -5.248210E-01 | 6.026665E-01 | -4.364087E-01 | 1.435842E-01 |
| 351 | -1.000000E+00 | -5.248210E-01 | 6.026665E-01 | -4.364087E-01 | 1.435842E-01 |
| 352 | 0.000000E+00 | 5.611905E-02 | 1.057253E-03 | 1.469180E-03 | 5.127003E-05 |
| Surface# | $a_{12}$ | $a_{14}$ | $a_{16}$ | $a_{18}$ | $a_{20}$ |
| 311 | 0.000000E+00 | 0.000000E+00 | 0.000000E+00 | 0.000000E+00 | 0.000000E+00 |
| 312 | 0.000000E+00 | 0.000000E+00 | 0.000000E+00 | 0.000000E+00 | 0.000000E+00 |
| 321 | 0.000000E+00 | 0.000000E+00 | 0.000000E+00 | 0.000000E+00 | 0.000000E+00 |
| 322 | 0.000000E+00 | 0.000000E+00 | 0.000000E+00 | 0.000000E+00 | 0.000000E+00 |
| 331 | 0.000000E+00 | 0.000000E+00 | 0.000000E+00 | 0.000000E+00 | 0.000000E+00 |
| 332 | 0.000000E+00 | 0.000000E+00 | 0.000000E+00 | 0.000000E+00 | 0.000000E+00 |
| 341 | 0.000000E+00 | 0.000000E+00 | 0.000000E+00 | 0.000000E+00 | 0.000000E+00 |
| 342 | 0.000000E+00 | 0.000000E+00 | 0.000000E+00 | 0.000000E+00 | 0.000000E+00 |
| 351 | 0.000000E+00 | 0.000000E+00 | 0.000000E+00 | 0.000000E+00 | 0.000000E+00 |
| 352 | 0.000000E+00 | 0.000000E+00 | 0.000000E+00 | 0.000000E+00 | 0.000000E+00 |

FIG. 17

| \multicolumn{7}{|c|}{EFL (Effective focus length) =0.773mm, HFOV (Half angular field of view) = 103.5deg., TTL (System length) = 12.506mm, Image height = 1.317mm, Fno = 2.2} |
|---|---|---|---|---|---|---|
| Surface # | | Radius (mm) | Thickness (mm) | Refractive index | Abbe number | Focus (mm) | Material |
| - | Object | ∞ | 300 | | | | |
| 411 | 1st lens element | 14.2330 | 1.7827_T1 | 1.591_n1 | 61.242_v1 | -5.656_f1 | plastic |
| 412 | | 2.5810 | 2.4559_G1 | | | | |
| 421 | 2nd lens lement | 10.4378 | 1.3150_T2 | 1.514_n2 | 56.264_v2 | -2.515_f2 | plastic |
| 422 | | 1.1006 | 0.9564_G2 | | | | |
| 431 | 3rd lens element | -4.0268 | 1.6989_T3 | 1.586_n3 | 30.181_v3 | 2.312_f3 | plastic |
| 432 | | -1.1718 | 0.1500_G3-TA | | | | |
| 400 | Aperture stop | ∞ | 0.1786_TA | | | | |
| 441 | 4th lens element | 3.1506 | 0.7106_T4 | 1.640_n4 | 23.899_v4 | -207.656_f4 | plastic |
| 442 | | 0.4630 | 0.0000_G4 | | | | |
| 451 | 5th lens element | 0.4630 | 1.3436_T5 | 1.533_n5 | 55.904_v5 | 7.308_f5 | plastic |
| 452 | | -1.7429 | 0.7141_G5F | | | | |
| 461 | IR cut filter | ∞ | 0.7000_TF | | | | |
| 462 | | ∞ | 0.5000_GFP | | | | |
| 470 | Image plane | ∞ | | | | | |

FIG. 20

| Aspherical parameters | | | | | |
|---|---|---|---|---|---|
| Surface# | K | $a_4$ | $a_6$ | $a_8$ | $a_{10}$ |
| 411 | 0.000000E+00 | 0.000000E+00 | 0.000000E+00 | 0.000000E+00 | 0.000000E+00 |
| 412 | 0.000000E+00 | 0.000000E+00 | 0.000000E+00 | 0.000000E+00 | 0.000000E+00 |
| 421 | 0.000000E+00 | -5.364932E-03 | 8.063149E-04 | -2.609008E-05 | 0.000000E+00 |
| 422 | 0.000000E+00 | -5.074405E-02 | -1.364613E-02 | -9.758538E-03 | 0.000000E+00 |
| 431 | 0.000000E+00 | -9.518993E-02 | 2.424431E-02 | -5.967392E-02 | 0.000000E+00 |
| 432 | 0.000000E+00 | 1.607677E-01 | -1.013231E-01 | 1.023848E-01 | 0.000000E+00 |
| 441 | 0.000000E+00 | 3.548585E-02 | -4.269644E-02 | 3.737838E-02 | -1.331651E-02 |
| 442 | -1.000000E+00 | -5.158057E-01 | 5.900134E-01 | -4.199728E-01 | 1.340978E-01 |
| 451 | -1.000000E+00 | -5.158057E-01 | 5.900134E-01 | -4.199728E-01 | 1.340978E-01 |
| 452 | 0.000000E+00 | 5.687969E-02 | 3.112736E-03 | 1.390800E-03 | -4.923879E-04 |
| Surface# | $a_{12}$ | $a_{14}$ | $a_{16}$ | $a_{18}$ | $a_{20}$ |
| 411 | 0.000000E+00 | 0.000000E+00 | 0.000000E+00 | 0.000000E+00 | 0.000000E+00 |
| 412 | 0.000000E+00 | 0.000000E+00 | 0.000000E+00 | 0.000000E+00 | 0.000000E+00 |
| 421 | 0.000000E+00 | 0.000000E+00 | 0.000000E+00 | 0.000000E+00 | 0.000000E+00 |
| 422 | 0.000000E+00 | 0.000000E+00 | 0.000000E+00 | 0.000000E+00 | 0.000000E+00 |
| 431 | 0.000000E+00 | 0.000000E+00 | 0.000000E+00 | 0.000000E+00 | 0.000000E+00 |
| 432 | 0.000000E+00 | 0.000000E+00 | 0.000000E+00 | 0.000000E+00 | 0.000000E+00 |
| 441 | 0.000000E+00 | 0.000000E+00 | 0.000000E+00 | 0.000000E+00 | 0.000000E+00 |
| 442 | 0.000000E+00 | 0.000000E+00 | 0.000000E+00 | 0.000000E+00 | 0.000000E+00 |
| 451 | 0.000000E+00 | 0.000000E+00 | 0.000000E+00 | 0.000000E+00 | 0.000000E+00 |
| 452 | 0.000000E+00 | 0.000000E+00 | 0.000000E+00 | 0.000000E+00 | 0.000000E+00 |

FIG. 21

| EFL (Effective focus length) = 0.775mm, HFOV (Half angular field of view) = 103.5deg, TTL (System length) = 12.718mm, Image height = 1.332mm, Fno = 2.2 ||||||||
| --- | --- | --- | --- | --- | --- | --- | --- |
| Surface # | | Radius (mm) | Thickness (mm) | Refractive index | Abbe number | Focus (mm) | Material |
| - | Object | ∞ | 300 | | | | |
| 511 | 1st lens element | 14.1175 | 2.3405_T1 | 1.591_n1 | 61.242_v1 | -5.519_f1 | plastic |
| 512 | | 2.4864 | 2.4320_G1 | | | | |
| 521 | 2nd lens lement | 12.6554 | 1.0076_T2 | 1.514_n2 | 56.264_v2 | -2.491_f2 | plastic |
| 522 | | 1.1308 | 0.9822_G2 | | | | |
| 531 | 3rd lens element | -4.0024 | 1.6939_T3 | 1.586_n3 | 30.181_v3 | 2.341_f3 | plastic |
| 532 | | -1.1813 | 0.1500_G3-TA | | | | |
| 500 | Aperture stop | ∞ | 0.1260_TA | | | | |
| 541 | 4th lens element | 3.1720 | 0.7490_T4 | 1.640_n4 | 23.899_v4 | -303.964_f4 | plastic |
| 542 | | 0.4691 | 0.0000_G4 | | | | |
| 551 | 5th lens element | 0.4691 | 1.3145_T5 | 1.533_n5 | 55.904_v5 | 7.258_f5 | plastic |
| 552 | | -1.7427 | 0.7220_G5F | | | | |
| 561 | IR cut filter | ∞ | 0.7000_TF | | | | |
| 562 | | ∞ | 0.5000_GFP | | | | |
| 570 | Image plane | ∞ | | | | | |

FIG. 24

| Aspherical parameters | | | | | |
|---|---|---|---|---|---|
| Surface# | K | $a_4$ | $a_6$ | $a_8$ | $a_{10}$ |
| 511 | 0.000000E+00 | 0.000000E+00 | 0.000000E+00 | 0.000000E+00 | 0.000000E+00 |
| 512 | 0.000000E+00 | 0.000000E+00 | 0.000000E+00 | 0.000000E+00 | 0.000000E+00 |
| 521 | 0.000000E+00 | -4.849184E-03 | 8.220505E-04 | -2.508569E-05 | 0.000000E+00 |
| 522 | 0.000000E+00 | -4.601117E-02 | -6.666686E-03 | -1.047817E-02 | 0.000000E+00 |
| 531 | 0.000000E+00 | -9.652765E-02 | 2.241761E-02 | -5.742182E-02 | 0.000000E+00 |
| 532 | 0.000000E+00 | 1.587376E-01 | -9.859428E-02 | 9.773225E-02 | 0.000000E+00 |
| 541 | 0.000000E+00 | 3.534395E-02 | -4.074510E-02 | 2.844421E-02 | -3.271074E-03 |
| 542 | -1.000000E+00 | -5.467528E-01 | 6.437518E-01 | -4.830186E-01 | 1.663049E-01 |
| 551 | -1.000000E+00 | -5.467528E-01 | 6.437518E-01 | -4.830186E-01 | 1.663049E-01 |
| 552 | 0.000000E+00 | 5.619616E-02 | 1.895824E-03 | 3.198453E-03 | -1.137077E-03 |
| Surface# | $a_{12}$ | $a_{14}$ | $a_{16}$ | $a_{18}$ | $a_{20}$ |
| 511 | 0.000000E+00 | 0.000000E+00 | 0.000000E+00 | 0.000000E+00 | 0.000000E+00 |
| 512 | 0.000000E+00 | 0.000000E+00 | 0.000000E+00 | 0.000000E+00 | 0.000000E+00 |
| 521 | 0.000000E+00 | 0.000000E+00 | 0.000000E+00 | 0.000000E+00 | 0.000000E+00 |
| 522 | 0.000000E+00 | 0.000000E+00 | 0.000000E+00 | 0.000000E+00 | 0.000000E+00 |
| 531 | 0.000000E+00 | 0.000000E+00 | 0.000000E+00 | 0.000000E+00 | 0.000000E+00 |
| 532 | 0.000000E+00 | 0.000000E+00 | 0.000000E+00 | 0.000000E+00 | 0.000000E+00 |
| 541 | 0.000000E+00 | 0.000000E+00 | 0.000000E+00 | 0.000000E+00 | 0.000000E+00 |
| 542 | 0.000000E+00 | 0.000000E+00 | 0.000000E+00 | 0.000000E+00 | 0.000000E+00 |
| 551 | 0.000000E+00 | 0.000000E+00 | 0.000000E+00 | 0.000000E+00 | 0.000000E+00 |
| 552 | 0.000000E+00 | 0.000000E+00 | 0.000000E+00 | 0.000000E+00 | 0.000000E+00 |

FIG. 25

| EFL (Effective focus length) =0.873mm, HFOV (Half angular field of view) = 103.5deg., TTL (System length) = 12.027mm, Image height = 1.515mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | ∞ | 300 | | | | |
| 611 | 1st lens element | 12.3957 | 2.1203_T1 | 1.591_n1 | 61.242_v1 | -5.959_f1 | plastic |
| 612 | | 2.5682 | 1.9773_G1 | | | | |
| 621 | 2nd lens lement | 11.3286 | 0.7519_T2 | 1.514_n2 | 56.264_v2 | -2.472_f2 | plastic |
| 622 | | 1.1160 | 0.9944_G2 | | | | |
| 631 | 3rd lens element | -3.9611 | 1.6685_T3 | 1.586_n3 | 30.181_v3 | 2.338_f3 | plastic |
| 632 | | -1.1765 | -0.0592_G3-TA | | | | |
| 600 | Aperture stop | ∞ | 0.2808_TA | | | | |
| 641 | 4th lens element | 3.2155 | 0.7309_T4 | 1.640_n4 | 23.899_v4 | -245.222_f4 | plastic |
| 642 | | 0.4744 | 0.0000_G4 | | | | |
| 651 | 5th lens element | 0.4744 | 1.6729_T5 | 1.533_n5 | 55.904_v5 | 6.224_f5 | plastic |
| 652 | | -1.7205 | 0.6891_G5F | | | | |
| 661 | IR cut filter | ∞ | 0.7000_TF | | | | |
| 662 | | ∞ | 0.5000_GFP | | | | |
| 670 | Image plane | ∞ | | | | | |

FIG. 28

| Aspherical parameters | | | | | |
|---|---|---|---|---|---|
| Surface# | K | $a_4$ | $a_6$ | $a_8$ | $a_{10}$ |
| 611 | 0.000000E+00 | 0.000000E+00 | 0.000000E+00 | 0.000000E+00 | 0.000000E+00 |
| 612 | 0.000000E+00 | 0.000000E+00 | 0.000000E+00 | 0.000000E+00 | 0.000000E+00 |
| 621 | 0.000000E+00 | -4.628952E-03 | 8.706209E-04 | -2.637161E-05 | 0.000000E+00 |
| 622 | 0.000000E+00 | -4.775376E-02 | -3.247274E-03 | -1.189665E-02 | 0.000000E+00 |
| 631 | 0.000000E+00 | -9.404423E-02 | 2.263813E-02 | -5.957864E-02 | 0.000000E+00 |
| 632 | 0.000000E+00 | 1.623799E-01 | -1.046059E-01 | 1.029223E-01 | 0.000000E+00 |
| 641 | 0.000000E+00 | 2.477674E-02 | -1.059156E-02 | -5.951972E-03 | 8.089287E-03 |
| 642 | -1.000000E+00 | -6.094299E-01 | 6.954487E-01 | -4.496887E-01 | 1.306713E-01 |
| 651 | -1.000000E+00 | -6.094299E-01 | 6.954487E-01 | -4.496887E-01 | 1.306713E-01 |
| 652 | 0.000000E+00 | 6.141376E-02 | 2.089882E-03 | 3.909468E-03 | -2.774292E-03 |
| Surface# | $a_{12}$ | $a_{14}$ | $a_{16}$ | $a_{18}$ | $a_{20}$ |
| 611 | 0.000000E+00 | 0.000000E+00 | 0.000000E+00 | 0.000000E+00 | 0.000000E+00 |
| 612 | 0.000000E+00 | 0.000000E+00 | 0.000000E+00 | 0.000000E+00 | 0.000000E+00 |
| 621 | 0.000000E+00 | 0.000000E+00 | 0.000000E+00 | 0.000000E+00 | 0.000000E+00 |
| 622 | 0.000000E+00 | 0.000000E+00 | 0.000000E+00 | 0.000000E+00 | 0.000000E+00 |
| 631 | 0.000000E+00 | 0.000000E+00 | 0.000000E+00 | 0.000000E+00 | 0.000000E+00 |
| 632 | 0.000000E+00 | 0.000000E+00 | 0.000000E+00 | 0.000000E+00 | 0.000000E+00 |
| 641 | 0.000000E+00 | 0.000000E+00 | 0.000000E+00 | 0.000000E+00 | 0.000000E+00 |
| 642 | 0.000000E+00 | 0.000000E+00 | 0.000000E+00 | 0.000000E+00 | 0.000000E+00 |
| 651 | 0.000000E+00 | 0.000000E+00 | 0.000000E+00 | 0.000000E+00 | 0.000000E+00 |
| 652 | 0.000000E+00 | 0.000000E+00 | 0.000000E+00 | 0.000000E+00 | 0.000000E+00 |

FIG. 29

| EFL (Effective focus length) =0.779mm, HFOV (Half angular field of view) =103.5deg., TTL (System length) = 12.918mm, Image height = 1.337mm, Fno = 2.2 ||||||||
|---|---|---|---|---|---|---|---|
| Surface # | | Radius (mm) | Thickness (mm) | Refractive index | Abbe number | Focus (mm) | Material |
| - | Object | ∞ | 300 | | | | |
| 711 | 1st lens element | 13.8136 | 2.7177_T1 | 1.591_n1 | 61.242_v1 | -5.568_f1 | plastic |
| 712 | | 2.4631 | 2.4740_G1 | | | | |
| 721 | 2nd lens lement | 15.5767 | 0.8085_T2 | 1.514_n2 | 56.264_v2 | -2.474_f2 | plastic |
| 722 | | 1.1544 | 0.9811_G2 | | | | |
| 731 | 3rd lens element | -3.8663 | 1.6865_T3 | 1.586_n3 | 30.181_v3 | 2.344_f3 | plastic |
| 732 | | -1.1768 | 0.1501_G3-TA | | | | |
| 700 | Aperture stop | ∞ | 0.1310_TA | | | | |
| 741 | 4th lens element | 3.1162 | 0.7004_T4 | 1.640_n4 | 23.899_v4 | -363.142_f4 | plastic |
| 742 | | 0.4652 | 0.0000_G4 | | | | |
| 751 | 5th lens element | 0.4652 | 1.3495_T5 | 1.533_n5 | 55.904_v5 | 7.010_f5 | plastic |
| 752 | | -1.7206 | 0.7187_G5F | | | | |
| 761 | IR cut filter | ∞ | 0.7000_TF | | | | |
| 762 | | ∞ | 0.5000_GFP | | | | |
| 770 | Image plane | ∞ | | | | | |

FIG. 32

| Aspherical parameters | | | | | |
|---|---|---|---|---|---|
| Surface# | K | $a_4$ | $a_6$ | $a_8$ | $a_{10}$ |
| 711 | 0.000000E+00 | 0.000000E+00 | 0.000000E+00 | 0.000000E+00 | 0.000000E+00 |
| 712 | 0.000000E+00 | 0.000000E+00 | 0.000000E+00 | 0.000000E+00 | 0.000000E+00 |
| 721 | 0.000000E+00 | -4.651275E-03 | 8.546677E-04 | -2.569210E-05 | 0.000000E+00 |
| 722 | 0.000000E+00 | -4.029476E-02 | -6.979880E-03 | -4.971200E-03 | 0.000000E+00 |
| 731 | 0.000000E+00 | -9.706147E-02 | 2.321626E-02 | -6.038939E-02 | 0.000000E+00 |
| 732 | 0.000000E+00 | 1.626404E-01 | -9.871239E-02 | 9.444742E-02 | 0.000000E+00 |
| 741 | 0.000000E+00 | 3.495634E-02 | -3.924839E-02 | 1.942348E-02 | 3.855197E-03 |
| 742 | -1.000000E+00 | -5.708327E-01 | 7.016823E-01 | -5.377826E-01 | 1.841869E-01 |
| 751 | -1.000000E+00 | -5.708327E-01 | 7.016823E-01 | -5.377826E-01 | 1.841869E-01 |
| 752 | 0.000000E+00 | 5.456923E-02 | 8.128052E-03 | -4.663395E-03 | 1.239106E-03 |
| Surface# | $a_{12}$ | $a_{14}$ | $a_{16}$ | $a_{18}$ | $a_{20}$ |
| 711 | 0.000000E+00 | 0.000000E+00 | 0.000000E+00 | 0.000000E+00 | 0.000000E+00 |
| 712 | 0.000000E+00 | 0.000000E+00 | 0.000000E+00 | 0.000000E+00 | 0.000000E+00 |
| 721 | 0.000000E+00 | 0.000000E+00 | 0.000000E+00 | 0.000000E+00 | 0.000000E+00 |
| 722 | 0.000000E+00 | 0.000000E+00 | 0.000000E+00 | 0.000000E+00 | 0.000000E+00 |
| 731 | 0.000000E+00 | 0.000000E+00 | 0.000000E+00 | 0.000000E+00 | 0.000000E+00 |
| 732 | 0.000000E+00 | 0.000000E+00 | 0.000000E+00 | 0.000000E+00 | 0.000000E+00 |
| 741 | 0.000000E+00 | 0.000000E+00 | 0.000000E+00 | 0.000000E+00 | 0.000000E+00 |
| 742 | 0.000000E+00 | 0.000000E+00 | 0.000000E+00 | 0.000000E+00 | 0.000000E+00 |
| 751 | 0.000000E+00 | 0.000000E+00 | 0.000000E+00 | 0.000000E+00 | 0.000000E+00 |
| 752 | 0.000000E+00 | 0.000000E+00 | 0.000000E+00 | 0.000000E+00 | 0.000000E+00 |

FIG. 33

| \multicolumn{7}{l}{EFL (Effective focus length) = 0.770mm, HFOV (Half angular field of view) = 103.5deg., TTL (System length) = 12.970mm, Image height = 1.328mm, Fno = 2.2} |
|---|---|---|---|---|---|---|---|
| Surface # | | Radius (mm) | Thickness (mm) | Refractive index | Abbe number | Focus (mm) | Material |
| - | Object | ∞ | 300 | | | | |
| 811 | 1st lens element | 15.0639 | 2.7619_T1 | 1.591_n1 | 61.242_v1 | -5.421_f1 | plastic |
| 812 | | 2.4617 | 2.3443_G1 | | | | |
| 821 | 2nd lens element | 12.8861 | 0.9224_T2 | 1.514_n2 | 56.264_v2 | -2.466_f2 | plastic |
| 822 | | 1.1252 | 1.0083_G2 | | | | |
| 831 | 3rd lens element | -4.0173 | 1.6732_T3 | 1.586_n3 | 30.181_v3 | 2.330_f3 | plastic |
| 832 | | -1.1760 | 0.1500_G3-TA | | | | |
| 800 | Aperture stop | ∞ | 0.1413_TA | | | | |
| 841 | 4th lens element | 3.1923 | 0.7207_T4 | 1.640_n4 | 23.899_v4 | -217.715_f4 | plastic |
| 842 | | 0.4696 | 0.0000_G4 | | | | |
| 851 | 5th lens element | 0.4696 | 1.3409_T5 | 1.533_n5 | 55.904_v5 | 6.730_f5 | plastic |
| 852 | | -1.6990 | 0.7076_G5F | | | | |
| 861 | IR cut filter | ∞ | 0.7000_TF | | | | |
| 862 | | ∞ | 0.5000_GFP | | | | |
| 870 | Image plane | ∞ | | | | | |

FIG. 36

| Aspherical parameters | | | | | |
|---|---|---|---|---|---|
| Surface# | K | $a_4$ | $a_6$ | $a_8$ | $a_{10}$ |
| 811 | 0.000000E-00 | 0.000000E+00 | 0.000000E+00 | 0.000000E+00 | 0.000000E+00 |
| 812 | 0.000000E-00 | 0.000000E+00 | 0.000000E+00 | 0.000000E+00 | 0.000000E+00 |
| 821 | 0.000000E-00 | -4.675018E-03 | 8.458127E-04 | -2.583700E-05 | 0.000000E+00 |
| 822 | 0.000000E-00 | -4.816352E-02 | -2.167126E-03 | -1.461218E-02 | 0.000000E+00 |
| 831 | 0.000000E-00 | -9.651664E-02 | 2.387509E-02 | -5.991640E-02 | 0.000000E+00 |
| 832 | 0.000000E-00 | 1.606027E-01 | -1.013877E-01 | 1.006504E-01 | 0.000000E+00 |
| 841 | 0.000000E-00 | 3.702580E-02 | -4.676815E-02 | 3.361065E-02 | -5.119867E-03 |
| 842 | -1.000000E-00 | -5.237180E-01 | 6.007933E-01 | -4.151218E-01 | 1.243511E-01 |
| 851 | -1.000000E-00 | -5.237180E-01 | 6.007933E-01 | -4.151218E-01 | 1.243511E-01 |
| 852 | 0.000000E-00 | 5.635892E-02 | 9.043196E-03 | -5.391408E-03 | 1.302498E-03 |
| Surface# | $a_{12}$ | $a_{14}$ | $a_{16}$ | $a_{18}$ | $a_{20}$ |
| 811 | 0.000000E-00 | 0.000000E+00 | 0.000000E+00 | 0.000000E+00 | 0.000000E+00 |
| 812 | 0.000000E-00 | 0.000000E+00 | 0.000000E+00 | 0.000000E+00 | 0.000000E+00 |
| 821 | 0.000000E-00 | 0.000000E+00 | 0.000000E+00 | 0.000000E+00 | 0.000000E+00 |
| 822 | 0.000000E-00 | 0.000000E+00 | 0.000000E+00 | 0.000000E+00 | 0.000000E+00 |
| 831 | 0.000000E-00 | 0.000000E+00 | 0.000000E+00 | 0.000000E+00 | 0.000000E+00 |
| 832 | 0.000000E-00 | 0.000000E+00 | 0.000000E+00 | 0.000000E+00 | 0.000000E+00 |
| 841 | 0.000000E-00 | 0.000000E+00 | 0.000000E+00 | 0.000000E+00 | 0.000000E+00 |
| 842 | 0.000000E-00 | 0.000000E+00 | 0.000000E+00 | 0.000000E+00 | 0.000000E+00 |
| 851 | 0.000000E-00 | 0.000000E+00 | 0.000000E+00 | 0.000000E+00 | 0.000000E+00 |
| 852 | 0.000000E-00 | 0.000000E+00 | 0.000000E+00 | 0.000000E+00 | 0.000000E+00 |

FIG. 37

| \multicolumn{7}{c}{EFL (Effective focus length) = 0.894 mm, HFOV (Half angular field of view) = 103.5deg., TTL (System length) = 13.363mm, Image height = 1.656mm, Fno = 2.2} |
|---|---|---|---|---|---|---|
| Surface # | | Radius (mm) | Thickness (mm) | Refractive index | Abbe number | Focus (mm) | Material |
| - | Object | ∞ | 300 | | | | |
| 911 | 1st lens element | 12.4385 | 2.4491_T1 | 1.591_n1 | 61.242_v1 | -6.531_f1 | plastic |
| 912 | | 2.7302 | 2.6713_G1 | | | | |
| 921 | 2nd lens element | 12.3295 | 0.8170_T2 | 1.514_n2 | 56.264_v2 | -2.484_f2 | plastic |
| 922 | | 1.1303 | 0.9839_G2 | | | | |
| 931 | 3rd lens element | -3.9287 | 1.5446_T3 | 1.586_n3 | 30.181_v3 | 2.420_f3 | plastic |
| 932 | | -1.1933 | 0.0285_G3-TA | | | | |
| 900 | Aperture stop | ∞ | 0.1348_TA | | | | |
| 941 | 4th lens element | 3.2037 | 0.7115_T4 | 1.640_n4 | 23.899_v4 | -529.300_f4 | plastic |
| 942 | | 0.4816 | 0.0000_G4 | | | | |
| 951 | 5th lens element | 0.4816 | 2.1470_T5 | 1.533_n5 | 55.904_v5 | 4.949_f5 | plastic |
| 952 | | -1.6477 | 0.6754_G5F | | | | |
| 961 | IR cut filter | ∞ | 0.7000_TF | | | | |
| 962 | | ∞ | 0.5000_GFP | | | | |
| 970 | Image plane | ∞ | | | | | |

FIG. 40

| Aspherical parameters | | | | | |
|---|---|---|---|---|---|
| Surface# | K | $a_4$ | $a_6$ | $a_8$ | $a_{10}$ |
| 911 | 0.000000E+00 | 0.000000E+00 | 0.000000E+00 | 0.000000E+00 | 0.000000E+00 |
| 912 | 0.000000E+00 | 0.000000E+00 | 0.000000E+00 | 0.000000E+00 | 0.000000E+00 |
| 921 | 0.000000E+00 | -4.526952E-03 | 8.186346E-04 | -3.578783E-05 | 0.000000E+00 |
| 922 | 0.000000E+00 | -7.412518E-02 | 5.577578E-03 | -1.066319E-02 | 0.000000E+00 |
| 931 | 0.000000E+00 | -9.345986E-02 | 2.504583E-02 | -5.576657E-02 | 0.000000E+00 |
| 932 | 0.000000E+00 | 1.632627E-01 | -1.080553E-01 | 8.644272E-02 | 0.000000E+00 |
| 941 | 0.000000E+00 | 1.710581E-02 | 3.045479E-02 | -8.768851E-02 | 6.106448E-02 |
| 942 | -1.000000E+00 | -6.671100E-01 | 8.938799E-01 | -6.454786E-01 | 1.931173E-01 |
| 951 | -1.000000E+00 | -6.671100E-01 | 8.938799E-01 | -6.454786E-01 | 1.931173E-01 |
| 952 | 0.000000E+00 | 6.431286E-02 | 3.200294E-03 | 1.523304E-03 | -1.064697E-03 |
| Surface# | $a_{12}$ | $a_{14}$ | $a_{16}$ | $a_{18}$ | $a_{20}$ |
| 911 | 0.000000E+00 | 0.000000E+00 | 0.000000E+00 | 0.000000E+00 | 0.000000E+00 |
| 912 | 0.000000E+00 | 0.000000E+00 | 0.000000E+00 | 0.000000E+00 | 0.000000E+00 |
| 921 | 0.000000E+00 | 0.000000E+00 | 0.000000E+00 | 0.000000E+00 | 0.000000E+00 |
| 922 | 0.000000E+00 | 0.000000E+00 | 0.000000E+00 | 0.000000E+00 | 0.000000E+00 |
| 931 | 0.000000E+00 | 0.000000E+00 | 0.000000E+00 | 0.000000E+00 | 0.000000E+00 |
| 932 | 0.000000E+00 | 0.000000E+00 | 0.000000E+00 | 0.000000E+00 | 0.000000E+00 |
| 941 | 0.000000E+00 | 0.000000E+00 | 0.000000E+00 | 0.000000E+00 | 0.000000E+00 |
| 942 | 0.000000E+00 | 0.000000E+00 | 0.000000E+00 | 0.000000E+00 | 0.000000E+00 |
| 951 | 0.000000E+00 | 0.000000E+00 | 0.000000E+00 | 0.000000E+00 | 0.000000E+00 |
| 952 | 0.000000E+00 | 0.000000E+00 | 0.000000E+00 | 0.000000E+00 | 0.000000E+00 |

FIG. 41

| EFL (Effective focus length) = 1.384 mm, HFOV (Half angular field of view) = 77.95deg., TTL (System length) = 18.355mm, Image height = 1.8mm, Fno = 2.4 ||||||||
|---|---|---|---|---|---|---|---|
| Surface # | | Radius (mm) | Thickness (mm) | Refractive index | Abbe number | Focus (mm) | Material |
| - | Object | ∞ | 300 | | | | |
| 1011 | 1st lens element | 117.7989 | 2.1627_T1 | 1.554_n1 | 63.333_v1 | -8.328_f1 | plastic |
| 1012 | | 4.4113 | 3.2905_G1 | | | | |
| 1021 | 2nd lens lement | 10.4681 | 2.0194_T2 | 1.514_n2 | 56.264_v2 | -4.118_f2 | plastic |
| 1022 | | 1.6446 | 1.8342_G2-TA | | | | |
| 1000 | Aperture stop | ∞ | 0.1090_TA | | | | |
| 1031 | 3rd lens element | -42.0680 | 2.1497_T3 | 1.586_n3 | 30.181_v3 | 3.281_f3 | plastic |
| 1032 | | -1.8736 | 0.1500_G3 | | | | |
| 1041 | 4th lens element | 5.1731 | 1.4263_T4 | 1.640_n4 | 23.899_v4 | -59.238_f4 | plastic |
| 1042 | | 0.6375 | 0.0000_G4 | | | | |
| 1051 | 5th lens element | 0.6375 | 2.7647_T5 | 1.533_n5 | 55.904_v5 | 15.291_f5 | plastic |
| 1052 | | -2.9787 | 1.1483_G5F | | | | |
| 1061 | IR cut filter | ∞ | 0.7000_TF | | | | |
| 1062 | | ∞ | 0.6000_GFP | | | | |
| 1070 | Image plane | ∞ | | | | | |

FIG. 44

| Aspherical parameters | | | | | |
|---|---|---|---|---|---|
| Surface# | K | $a_4$ | $a_6$ | $a_8$ | $a_{10}$ |
| 1011 | 0.000000E-00 | 0.000000E+00 | 0.000000E+00 | 0.000000E+00 | 0.000000E+00 |
| 1012 | 0.000000E-00 | 0.000000E+00 | 0.000000E+00 | 0.000000E+00 | 0.000000E+00 |
| 1021 | 0.000000E-00 | 5.673409E-03 | -5.190901E-04 | 1.804107E-05 | 0.000000E+00 |
| 1022 | 0.000000E-00 | 8.690894E-03 | 1.362627E-03 | -1.553005E-03 | 0.000000E+00 |
| 1031 | 0.000000E-00 | -8.608826E-03 | -1.055417E-03 | -4.346167E-03 | 0.000000E+00 |
| 1032 | 0.000000E-00 | 4.879227E-02 | -1.334669E-02 | 2.621183E-03 | 0.000000E+00 |
| 1041 | 0.000000E-00 | 1.376830E-02 | -5.761400E-03 | 2.465265E-04 | 3.412181E-05 |
| 1042 | -1.000000E-00 | -1.621787E-01 | 9.444051E-02 | -2.831480E-02 | 2.950056E-03 |
| 1051 | -1.000000E-00 | -1.621787E-01 | 9.444051E-02 | -2.831480E-02 | 2.950056E-03 |
| 1052 | 0.000000E-00 | 1.565331E-02 | 2.721996E-03 | -2.000266E-03 | 3.289047E-04 |
| Surface# | $a_{12}$ | $a_{14}$ | $a_{16}$ | $a_{18}$ | $a_{20}$ |
| 1011 | 0.000000E-00 | 0.000000E+00 | 0.000000E+00 | 0.000000E+00 | 0.000000E+00 |
| 1012 | 0.000000E-00 | 0.000000E+00 | 0.000000E+00 | 0.000000E+00 | 0.000000E+00 |
| 1021 | 0.000000E-00 | 0.000000E+00 | 0.000000E+00 | 0.000000E+00 | 0.000000E+00 |
| 1022 | 0.000000E-00 | 0.000000E+00 | 0.000000E+00 | 0.000000E+00 | 0.000000E+00 |
| 1031 | 0.000000E-00 | 0.000000E+00 | 0.000000E+00 | 0.000000E+00 | 0.000000E+00 |
| 1032 | 0.000000E-00 | 0.000000E+00 | 0.000000E+00 | 0.000000E+00 | 0.000000E+00 |
| 1041 | 0.000000E-00 | 0.000000E+00 | 0.000000E+00 | 0.000000E+00 | 0.000000E+00 |
| 1042 | 0.000000E-00 | 0.000000E+00 | 0.000000E+00 | 0.000000E+00 | 0.000000E+00 |
| 1051 | 0.000000E-00 | 0.000000E+00 | 0.000000E+00 | 0.000000E+00 | 0.000000E+00 |
| 1052 | 0.000000E-00 | 0.000000E+00 | 0.000000E+00 | 0.000000E+00 | 0.000000E+00 |

FIG. 45

| \multicolumn{7}{c|}{EFL (Effective focus length) =0.749mm, HFOV (Half angular field of view) =103.5deg., TTL (System length) = 11.992mm, Image height = 1.179mm, Fno = 2.4} |
|---|---|---|---|---|---|---|
| Surface # | | Radius (mm) | Thickness (mm) | Refractive index | Abbe number | Focus (mm) | Material |
| - | Object | ∞ | 300 | | | | |
| 1111 | 1st lens element | 13.2432 | 1.6395_T1 | 1.591_n1 | 61.242_v1 | -5.280_f1 | plastic |
| 1112 | | 2.4092 | 2.3389_G1 | | | | |
| 1121 | 2nd lens lement | -49.0499 | 1.1347_T2 | 1.514_n2 | 56.264_v2 | -2.525_f2 | plastic |
| 1122 | | 1.3428 | 0.8287_G2 | | | | |
| 1131 | 3rd lens element | -3.4096 | 1.8044_T3 | 1.586_n3 | 30.181_v3 | 2.418_f3 | plastic |
| 1132 | | -1.1968 | 0.1500_G3-TA | | | | |
| 1100 | Aperture stop | ∞ | 0.1111_TA | | | | |
| 1141 | 4th lens element | 2.8550 | 0.7988_T4 | 1.640_n4 | 23.899_v4 | 110.631_f4 | plastic |
| 1142 | | 0.4527 | 0.0000_G4 | | | | |
| 1151 | 5th lens element | 0.4527 | 1.3131_T5 | 1.533_n5 | 55.904_v5 | 7.744_f5 | plastic |
| 1152 | | -1.7545 | 0.6729_G5F | | | | |
| 1161 | IR cut filter | ∞ | 0.7000_TF | | | | |
| 1162 | | ∞ | 0.5000_GFP | | | | |
| 1170 | Image plane | ∞ | | | | | |

FIG. 48

| Aspherical parameters | | | | | |
|---|---|---|---|---|---|
| Surface# | K | $a_4$ | $a_6$ | $a_8$ | $a_{10}$ |
| 1111 | 0.000000E+00 | 0.000000E+00 | 0.000000E+00 | 0.000000E+00 | 0.000000E+00 |
| 1112 | 0.000000E+00 | 0.000000E+00 | 0.000000E+00 | 0.000000E+00 | 0.000000E+00 |
| 1121 | 0.000000E+00 | -2.658284E-03 | 1.132914E-03 | -4.942869E-05 | 0.000000E+00 |
| 1122 | 0.000000E+00 | -1.707101E-02 | 1.968571E-02 | 4.110617E-03 | 0.000000E+00 |
| 1131 | 0.000000E+00 | -9.077541E-02 | 2.047262E-02 | -7.088268E-02 | 0.000000E+00 |
| 1132 | 0.000000E+00 | 1.632128E-01 | -9.443366E-02 | 7.318097E-02 | 0.000000E+00 |
| 1141 | 0.000000E+00 | 6.423247E-02 | -1.074480E-01 | 7.589888E-02 | 8.792573E-03 |
| 1142 | 0.000000E+00 | 6.423247E-02 | -1.074480E-01 | 7.589888E-02 | 8.792573E-03 |
| 1151 | -1.000000E+00 | -3.341179E-01 | 2.550922E-01 | -1.174855E-01 | 4.386685E-02 |
| 1152 | 0.000000E+00 | 4.635773E-02 | -2.421059E-02 | 4.574784E-02 | -1.424488E-02 |
| Surface# | $a_{12}$ | $a_{14}$ | $a_{16}$ | $a_{18}$ | $a_{20}$ |
| 1111 | 0.000000E+00 | 0.000000E+00 | 0.000000E+00 | 0.000000E+00 | 0.000000E+00 |
| 1112 | 0.000000E+00 | 0.000000E+00 | 0.000000E+00 | 0.000000E+00 | 0.000000E+00 |
| 1121 | 0.000000E+00 | 0.000000E+00 | 0.000000E+00 | 0.000000E+00 | 0.000000E+00 |
| 1122 | 0.000000E+00 | 0.000000E+00 | 0.000000E+00 | 0.000000E+00 | 0.000000E+00 |
| 1131 | 0.000000E+00 | 0.000000E+00 | 0.000000E+00 | 0.000000E+00 | 0.000000E+00 |
| 1132 | 0.000000E+00 | 0.000000E+00 | 0.000000E+00 | 0.000000E+00 | 0.000000E+00 |
| 1141 | 0.000000E+00 | 0.000000E+00 | 0.000000E+00 | 0.000000E+00 | 0.000000E+00 |
| 1142 | 0.000000E+00 | 0.000000E+00 | 0.000000E+00 | 0.000000E+00 | 0.000000E+00 |
| 1151 | 0.000000E+00 | 0.000000E+00 | 0.000000E+00 | 0.000000E+00 | 0.000000E+00 |
| 1152 | 0.000000E+00 | 0.000000E+00 | 0.000000E+00 | 0.000000E+00 | 0.000000E+00 |

FIG. 49

| \multicolumn{7}{c}{EFL (Effective focus length) = 0.767mm, HFOV (Half angular field of view) = 103.5deg., TTL (System length) = 11.399mm, Image height = 1.348mm, Fno = 2.45} |
|---|---|---|---|---|---|---|
| Surface # | | Radius (mm) | Thickness (mm) | Refractive index | Abbe number | Focus (mm) | Material |
| - | Object | ∞ | 300 | | | | |
| 1211 | 1st lens element | 11.8965 | 1.6321_T1 | 1.591_n1 | 61.242_v1 | -4.788_f1 | plastic |
| 1212 | | 2.1693 | 2.1635_G1 | | | | |
| 1221 | 2nd lens element | 38.8994 | 0.8526_T2 | 1.514_n2 | 56.264_v2 | -2.274_f2 | plastic |
| 1222 | | 1.1257 | 0.9435_G2 | | | | |
| 1231 | 3rd lens element | -5.2030 | 1.6973_T3 | 1.586_n3 | 30.181_v3 | 2.434_f3 | plastic |
| 1232 | | -1.2542 | 0.1502_G3-TA | | | | |
| 1200 | Aperture stop | ∞ | 0.0982_TA | | | | |
| 1241 | 4th lens element | 2.2425 | 0.7208_T4 | 1.640_n4 | 23.899_v4 | 16.788_f4 | plastic |
| 1242 | | 0.4817 | 0.0000_G4 | | | | |
| 1251 | 5th lens element | 0.4817 | 1.3743_T5 | 1.533_n5 | 55.904_v5 | 30.752_f5 | plastic |
| 1252 | | -2.5122 | 0.5667_G5F | | | | |
| 1261 | IR cut filter | ∞ | 0.7000_TF | | | | |
| 1262 | | ∞ | 0.5000_GFP | | | | |
| 1270 | Image plane | ∞ | | | | | |

FIG. 52

| Aspherical parameters | | | | | |
|---|---|---|---|---|---|
| Surface# | K | $a_4$ | $a_6$ | $a_8$ | $a_{10}$ |
| 1211 | 0.000000E+00 | 0.000000E+00 | 0.000000E+00 | 0.000000E+00 | 0.000000E+00 |
| 1212 | 0.000000E+00 | 0.000000E+00 | 0.000000E+00 | 0.000000E+00 | 0.000000E+00 |
| 1221 | 0.000000E+00 | -4.942447E-03 | 3.315907E-04 | -5.367329E-05 | 0.000000E+00 |
| 1222 | 0.000000E+00 | -7.426726E-02 | 1.005192E-02 | -2.120252E-02 | 0.000000E+00 |
| 1231 | 0.000000E+00 | -7.744509E-02 | 3.876260E-02 | -2.851689E-02 | 0.000000E+00 |
| 1232 | 0.000000E+00 | 1.614310E-01 | -1.032348E-01 | 8.115571E-02 | 0.000000E+00 |
| 1241 | 0.000000E+00 | 5.755143E-02 | -9.728956E-02 | 2.302176E-01 | -1.844810E-01 |
| 1242 | 0.000000E+00 | 5.755143E-02 | -9.728956E-02 | 2.302176E-01 | -1.844810E-01 |
| 1251 | -1.000000E+00 | -6.595237E-01 | 5.996226E-01 | -1.068286E-01 | -5.884485E-02 |
| 1252 | 0.000000E+00 | 1.221291E-01 | 6.737459E-03 | 6.157958E-02 | -3.076691E-02 |
| Surface# | $a_{12}$ | $a_{14}$ | $a_{16}$ | $a_{18}$ | $a_{20}$ |
| 1211 | 0.000000E+00 | 0.000000E+00 | 0.000000E+00 | 0.000000E+00 | 0.000000E+00 |
| 1212 | 0.000000E+00 | 0.000000E+00 | 0.000000E+00 | 0.000000E+00 | 0.000000E+00 |
| 1221 | 0.000000E+00 | 0.000000E+00 | 0.000000E+00 | 0.000000E+00 | 0.000000E+00 |
| 1222 | 0.000000E+00 | 0.000000E+00 | 0.000000E+00 | 0.000000E+00 | 0.000000E+00 |
| 1231 | 0.000000E+00 | 0.000000E+00 | 0.000000E+00 | 0.000000E+00 | 0.000000E+00 |
| 1232 | 0.000000E+00 | 0.000000E+00 | 0.000000E+00 | 0.000000E+00 | 0.000000E+00 |
| 1241 | 0.000000E+00 | 0.000000E+00 | 0.000000E+00 | 0.000000E+00 | 0.000000E+00 |
| 1242 | 0.000000E+00 | 0.000000E+00 | 0.000000E+00 | 0.000000E+00 | 0.000000E+00 |
| 1251 | 0.000000E+00 | 0.000000E+00 | 0.000000E+00 | 0.000000E+00 | 0.000000E+00 |
| 1252 | 0.000000E+00 | 0.000000E+00 | 0.000000E+00 | 0.000000E+00 | 0.000000E+00 |

FIG. 53

| Embodiment | 1st | 2nd | 3rd | 4th | 5th | 6th |
|---|---|---|---|---|---|---|
| T1 | 1.300 | 1.426 | 1.701 | 1.783 | 2.341 | 2.120 |
| G1 | 2.150 | 2.129 | 2.351 | 2.456 | 2.432 | 1.977 |
| T2 | 0.900 | 1.106 | 0.785 | 1.315 | 1.008 | 0.752 |
| G2 | 0.682 | 0.879 | 0.984 | 0.956 | 0.982 | 0.994 |
| T3 | 1.578 | 1.777 | 1.696 | 1.699 | 1.694 | 1.669 |
| G3 | 0.151 | 0.184 | 0.291 | 0.329 | 0.276 | 0.222 |
| T4 | 0.730 | 0.702 | 0.716 | 0.711 | 0.749 | 0.731 |
| G4 | 0.000 | 0.000 | 0.000 | 0.000 | 0.000 | 0.000 |
| T5 | 2.250 | 2.438 | 1.356 | 1.344 | 1.315 | 1.673 |
| G5F | 0.693 | 0.599 | 0.721 | 0.714 | 0.722 | 0.689 |
| TF | 0.700 | 0.700 | 0.700 | 0.700 | 0.700 | 0.700 |
| GFP | 0.500 | 0.500 | 0.500 | 0.500 | 0.500 | 0.500 |
| EFL | 0.864 | 0.874 | 0.772 | 0.773 | 0.775 | 0.873 |
| TL | 9.741 | 10.642 | 9.881 | 10.592 | 10.796 | 10.138 |
| ALT | 6.758 | 7.450 | 6.255 | 6.851 | 7.106 | 6.944 |
| Gaa | 2.983 | 3.193 | 3.626 | 3.741 | 3.690 | 3.193 |
| TTL | 11.634 | 12.441 | 11.802 | 12.506 | 12.718 | 12.027 |
| Gaa/(T4+T1) | 1.470 | 1.500 | 1.500 | 1.500 | 1.194 | 1.120 |
| (T5+T3)/T4 | 5.243 | 6.002 | 4.262 | 4.282 | 4.016 | 4.572 |
| TL/(T4+G3) | 11.059 | 12.000 | 9.810 | 10.192 | 10.532 | 10.643 |
| G2/(T4+G3) | 0.775 | 0.992 | 0.977 | 0.920 | 0.958 | 1.044 |
| (G1+T3)/G2 | 5.462 | 4.442 | 4.113 | 4.344 | 4.201 | 3.666 |
| ALT/(T5+G3) | 2.815 | 2.841 | 3.796 | 4.097 | 4.467 | 3.666 |
| TTL/(T5+G3) | 4.846 | 4.744 | 7.163 | 7.478 | 7.996 | 6.348 |
| T2/T4 | 1.233 | 1.574 | 1.097 | 1.851 | 1.345 | 1.029 |
| T5/T3 | 1.426 | 1.372 | 0.800 | 0.791 | 0.776 | 1.003 |
| TL/(T5+G3) | 4.058 | 4.058 | 5.997 | 6.334 | 6.787 | 5.351 |
| (T1+G2)/G1 | 0.922 | 1.083 | 1.142 | 1.115 | 1.366 | 1.575 |
| G1/T1 | 1.654 | 1.493 | 1.382 | 1.378 | 1.039 | 0.933 |
| TL/(G1+T5) | 2.214 | 2.330 | 2.665 | 2.788 | 2.882 | 2.777 |
| ALT/(G1+T5) | 1.536 | 1.631 | 1.687 | 1.803 | 1.897 | 1.902 |
| ALT/(T4+G3) | 7.672 | 8.400 | 6.210 | 6.593 | 6.932 | 7.291 |
| TTL/(T4+G3) | 13.208 | 14.028 | 11.716 | 12.034 | 12.407 | 12.627 |
| TTL/(G1+T5) | 2.644 | 2.724 | 3.183 | 3.291 | 3.395 | 3.295 |
| T2/T5 | 0.400 | 0.454 | 0.579 | 0.979 | 0.766 | 0.449 |
| (T5+G3)/G2 | 3.517 | 2.983 | 1.675 | 1.748 | 1.619 | 1.905 |
| (T5+G2)/T4 | 4.017 | 4.723 | 3.268 | 3.237 | 3.066 | 3.649 |
| ALT/T4 | 9.257 | 10.607 | 8.735 | 9.641 | 9.486 | 9.501 |

FIG. 54A

| Embodiment | 7th | 8th | 9th | 10th | 11th | 12th |
|---|---|---|---|---|---|---|
| T1 | 2.718 | 2.762 | 2.449 | 2.163 | 1.640 | 1.632 |
| G1 | 2.474 | 2.344 | 2.671 | 3.291 | 2.339 | 2.164 |
| T2 | 0.809 | 0.922 | 0.817 | 2.019 | 1.135 | 0.853 |
| G2 | 0.981 | 1.008 | 0.984 | 1.943 | 0.829 | 0.944 |
| T3 | 1.686 | 1.673 | 1.545 | 2.150 | 1.804 | 1.697 |
| G3 | 0.281 | 0.291 | 0.163 | 0.150 | 0.261 | 0.248 |
| T4 | 0.700 | 0.721 | 0.711 | 1.426 | 0.799 | 0.721 |
| G4 | 0.000 | 0.000 | 0.000 | 0.000 | 0.000 | 0.000 |
| T5 | 1.350 | 1.341 | 2.147 | 2.765 | 1.313 | 1.374 |
| G5F | 0.719 | 0.708 | 0.675 | 1.148 | 0.673 | 0.567 |
| TF | 0.700 | 0.700 | 0.700 | 0.700 | 0.700 | 0.700 |
| GFP | 0.500 | 0.500 | 0.500 | 0.600 | 0.500 | 0.500 |
| EFL | 0.779 | 0.770 | 0.894 | 1.384 | 0.749 | 0.767 |
| TL | 10.999 | 11.063 | 11.488 | 17.055 | 10.119 | 9.633 |
| ALT | 7.263 | 7.419 | 7.669 | 10.523 | 6.691 | 6.277 |
| Gaa | 3.736 | 3.644 | 3.818 | 5.384 | 3.429 | 3.355 |
| TTL | 12.918 | 12.970 | 13.363 | 18.355 | 11.992 | 11.399 |
| Gaa/(T4+T1) | 1.093 | 1.046 | 1.208 | 1.500 | 1.406 | 1.426 |
| (T5+T3)/T4 | 4.335 | 4.182 | 5.189 | 3.446 | 3.903 | 4.261 |
| TL/(T4+G3) | 11.205 | 10.932 | 13.133 | 10.820 | 9.547 | 9.939 |
| G2/(T4+G3) | 1.000 | 0.996 | 1.125 | 1.233 | 0.782 | 0.974 |
| (G1+T3)/G2 | 4.240 | 3.985 | 4.285 | 2.800 | 5.000 | 4.092 |
| ALT/(T5+G3) | 4.454 | 4.545 | 3.320 | 3.610 | 4.250 | 3.869 |
| TTL/(T5+G3) | 7.922 | 7.947 | 5.784 | 6.297 | 7.618 | 7.025 |
| T2/T4 | 1.154 | 1.280 | 1.148 | 1.416 | 1.421 | 1.183 |
| T5/T3 | 0.800 | 0.801 | 1.390 | 1.286 | 0.728 | 0.810 |
| TL/(T5+G3) | 6.745 | 6.778 | 4.972 | 5.851 | 6.428 | 5.937 |
| (T1+G2)/G1 | 1.495 | 1.608 | 1.285 | 1.248 | 1.055 | 1.190 |
| G1/T1 | 0.910 | 0.849 | 1.091 | 1.521 | 1.427 | 1.326 |
| TL/(G1+T5) | 2.877 | 3.002 | 2.384 | 2.817 | 2.771 | 2.723 |
| ALT/(G1+T5) | 1.899 | 2.013 | 1.592 | 1.738 | 1.832 | 1.774 |
| ALT/(T4+G3) | 7.399 | 7.331 | 8.767 | 6.676 | 6.312 | 6.477 |
| TTL/(T4+G3) | 13.160 | 12.817 | 15.277 | 11.644 | 11.314 | 11.762 |
| TTL/(G1+T5) | 3.378 | 3.520 | 2.773 | 3.031 | 3.284 | 3.222 |
| T2/T5 | 0.599 | 0.688 | 0.381 | 0.730 | 0.864 | 0.620 |
| (T5+G3)/G2 | 1.662 | 1.619 | 2.348 | 1.500 | 1.900 | 1.720 |
| (T5+G2)/T4 | 3.328 | 3.260 | 4.401 | 3.301 | 2.681 | 3.215 |
| ALT/T4 | 10.369 | 10.295 | 10.779 | 7.378 | 8.376 | 8.708 |

FIG. 54B

OPTICAL IMAGING LENS

INCORPORATION BY REFERENCE

This application claims priority to P.R.C. Patent Application No. 2016105530249, titled "Optical imaging lens", filed on Jul. 14, 2016, with the State Intellectual Property Office of the People's Republic of China (SIPO).

TECHNICAL FIELD

The present disclosure relates to an optical imaging lens, and particularly, relates to an optical imaging lens having five lens elements.

BACKGROUND

The ever-increasing demand for smaller sized mobile devices, such as cell phones, digital cameras, tablet computers, personal digital assistants (PDAs), etc. has triggered a corresponding need for smaller sized photography modules contained within the device, such as optical imaging lenses, module housing units, image sensors, etc. Size reductions may be achieved from various aspects of the mobile devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenging problem. Furthermore, achieving a high view angle and a great aperture size are important in certain applications, such as where a photography module is used in vehicles.

In light of the above issues, designing an optical imaging lens with a shorter length is not easily achieved by merely decreasing the size of each element proportionally. Additionally, factors such as material nature, production difficulty, assembly yield, and so forth are crucial to the application of the design. Accordingly, there is a need for optical imaging lenses comprising five lens elements therein, with a shorter length, which also have good optical characteristics.

SUMMARY

The present disclosure provides for optical imaging lenses. By controlling the convex or concave shape of the surfaces and at least one inequality, the length of the optical imaging lens may be shortened while maintaining good optical characteristics and system functionality.

In an example embodiment, an optical imaging lens may comprise, sequentially from an object side to an image side along an optical axis, first, second, third, fourth and fifth lens elements, each of the first, second, third, fourth and fifth lens elements having refracting power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G1, the central thickness of the second lens element, represented by T2, an air gap between the second lens element and the third lens element along the optical axis, represented by G2, the central thickness of the third lens element, represented by T3, an air gap between the third lens element and the fourth lens element along the optical axis, represented by G3, the central thickness of the fourth lens element, represented by T4, the distance between the aperture stop and the object-side surface of the next lens element along the optical axis, represented by TA, an air gap between the fourth lens element and the fifth lens element along the optical axis, represented by G4, the central thickness of the fifth lens element, represented by T5, a distance between the image-side surface of the fifth lens element and the object-side surface of a filtering unit along the optical axis, represented by G5F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refracting power of the first lens element, represented by n1, the refracting power of the second lens element, represented by n2, the refracting power of the third lens element, represented by n3, the refracting power of the fourth lens element, represented by n4, the refracting power of the fifth lens element, represented by n5, he refracting power of the filtering unit, represented by nf, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens, represented by EFL or f, a distance between the object-side surface of the first lens element and the image-side surface of the fifth lens element along the optical axis, represented by TL, a distance between the object-side surface of the first lens element and an image plane along the optical axis, represented by TTL, a sum of the central thicknesses of all five lens elements, i.e. a sum of T1, T2, T3, T4 and T5, represented by ALT, a sum of all four air gaps from the first lens element to the fifth lens element along the optical axis, i.e. a sum of G1, G2, G3 and G4, represented by Gaa, and a back focal length of the optical imaging lens, which is defined as the distance from the image-side surface of the fifth lens element to the image plane along the optical axis, i.e. a sum of G5F, TF and GFP, and represented by BFL.

In an aspect of the present disclosure, in the optical imaging lens, the first lens element has negative refracting power, the second lens element has negative refracting power, the object-side surface of the third lens element comprises a concave portion in a vicinity of a periphery of the third lens element, the image-side surface of the fourth lens element comprises a concave portion in a vicinity of the optical axis, the fifth lens element is constructed by plastic material, the optical imaging lens may comprise no other lenses having refracting power beyond the five lens elements, and Gaa, T4 and T1 satisfy the inequality:

$$Gaa/(T4+T1) \leq 1.5 \qquad \text{Inequality (1)}.$$

In another example embodiment, other inequality(s), such as those relating to the ratio among parameters could be taken into consideration. For example:

$$(T5+T3)/T4 \leq 6.2 \qquad \text{Inequality (2)};$$

$$TL/(T4+G3) \leq 13.8 \qquad \text{Inequality (3)};$$

$$G2/(T4+G3) \leq 1.7 \qquad \text{Inequality (4)};$$

$(G1+T3)/G2 \geq 2.8$  Inequality (5);

$ALT/(T5+G3) \leq 5$  Inequality (6);

$TTL/(T5+G3) \leq 8.5$  Inequality (7);

$T2/T4 \leq 2.2$  Inequality (8);

$T5/T3 \geq 0.7$  Inequality (9);

$TL/(T5+G3) \leq 6.8$  Inequality (10);

$(T1+G2)/G1 \leq 2$  Inequality (11);

$G1/T1 \geq 0.8$  Inequality (12);

$TL/(G1+T5) \leq 3.3$  Inequality (13);

$ALT/(G1+T5) \leq 2.2$  Inequality (14);

$ALT/(T4+G3) \leq 9.2$  Inequality (15);

$TTL/(T4+G3) \leq 16$  Inequality (16);

$TTL/(G1+T5) \leq 3.8$  Inequality (17);

$T2/T5 \leq 1$  Inequality (18);

$(T5+G3)/G2 \geq 1.5$  Inequality (19);

$(T5+G2)/T4 \leq 5.5$  Inequality (20); and/or $ALT/T4 \leq 13.5$  Inequality (21).

The above example embodiments are not limited and could be selectively incorporated in other embodiments described herein.

Through controlling the convex or concave shape of the surfaces and at least one inequality, the optical imaging lens in example embodiments achieves good optical characteristics and further allows the length of the optical imaging lens to be effectively shortened.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 48 depicts a table of optical data for each lens element of the optical imaging lens of an eleventh embodiment of the present disclosure;

FIG. 49 depicts a table of aspherical data of an eleventh embodiment of the optical imaging lens according to the present disclosure;

FIG. 52 depicts a table of optical data for each lens element of the optical imaging lens of a twelfth embodiment of the present disclosure;

FIG. 53 depicts a table of aspherical data of a twelfth embodiment of the optical imaging lens according to the present disclosure;

FIGS. 54A and 54B depicts a table for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of all twelve example embodiments.

DETAILED DESCRIPTION

Figure 5:
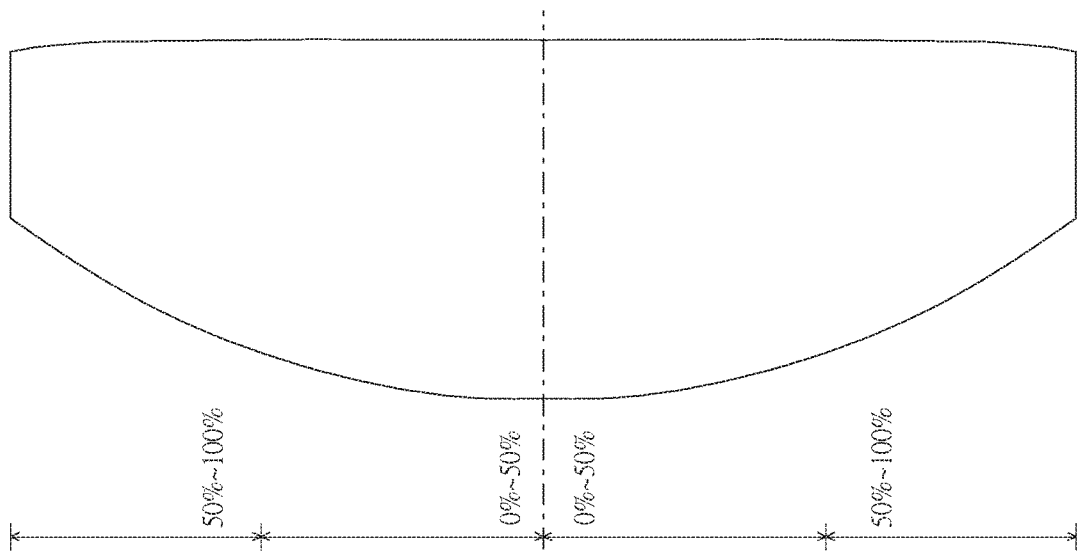
FIG. 5 depicts a cross-sectional view showing the relation between the shape of a portion and the effective radius of a third example.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those described portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Figure 3:
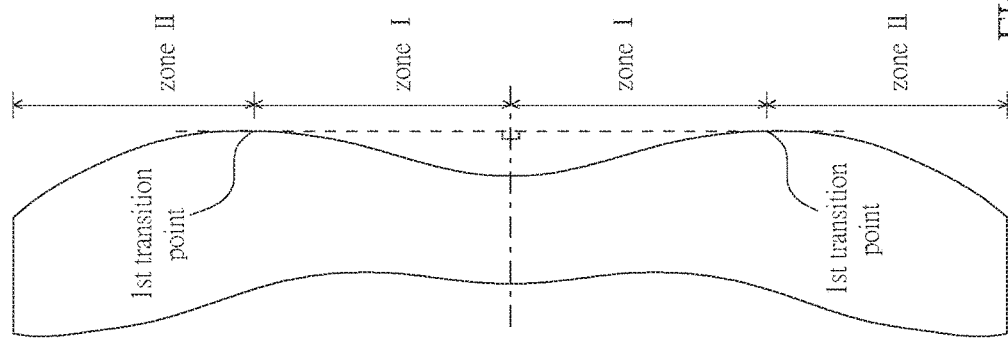
FIG. 3 depicts a cross-sectional view showing the relation between the shape of a portion and the effective radius of a first example.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Figure 4:
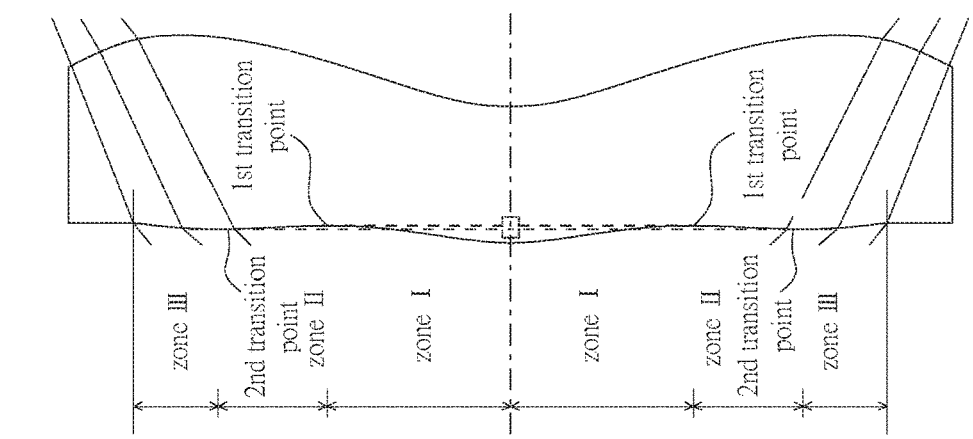
FIG. 4 depicts a cross-sectional view showing the relation between the shape of a portion and the effective radius of a second example.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

In the present disclosure, examples of an optical imaging lens which is a prime lens are provided. Example embodiments of an optical imaging lens may comprise a first lens element, a second lens element, a third lens element, a fourth lens element and a fifth lens element, each of the lens elements may comprise refracting power, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refracting power beyond the five lens elements. In an example embodiment: the first lens element has negative refracting power, the second lens element has negative refracting power, the object-side surface of the third lens element comprises a concave portion in a vicinity of a periphery of the third lens element, the image-side surface of the fourth lens element comprises a concave portion in a vicinity of the optical axis, the fifth lens element is constructed by plastic material, and the optical imaging lens may comprise no other lenses having refracting power beyond the five lens elements.

Preferably, the lens elements are designed in light of the optical characteristics and the length of the optical imaging lens. For example, the negative refracting powers of the first and second lens elements may assist in collecting light with higher incident angle. The concave portion in a vicinity of a periphery of the third lens element formed on the object-side surface thereof may assist in adjusting abberations which occur in the former two lens elements. The concave portion in a vicinity of the optical axis formed on the image-side surface of the fourth lens element may assist in adjusting abberations which occur in the former three lens elements. Though aforesaid designs, the length of the optical imaging lens may be reduced and meanwhile the imaging quality, such as clarity of the image, of the optical imaging lens may be enhanced.

Additionally, values of parameters may be controlled to assist in designing optical imaging lenses with good optical characteristics and a shortened length. To shorten the length of the optical imaging lens, the thickness of the lens elements and/or the air gaps between the lens elements are required optionally for shorter distances; however, considering the difficulty to achieve the smaller dimensions of the optical imaging lens set forth herein while maintaining imaging quality, the optical imaging lens may be better configured if it satisfies $Gaa/(T4+T1) \le 1.5$, and the value of $Gaa/(T4+T1)$ may preferably be within about 1.00~1.50; $(T5+T3)/T4 \le 6.2$, and the value of $(T5+T3)/T4$ may preferably be within about 3.00~6.20; $TL/(T4+G3) \le 13.8$, and the value of $TL/(T4+G3)$ may preferably be within about 9.50~13.80; $G2/(T4+G3) \le 1.7$, and the value of $G2/(T4+G3)$ may preferably be within about 0.50~1.70; $(G1+T3)/G2 \ge 2.8$, and the value of $(G1+T3)/G2$ may preferably be within about 2.80~5.50; $ALT/(T5+G3) \le 5$, and the value of $ALT/(T5+G3)$ may preferably be within about 2.50~5.00; $TTL/(T5+G3) \le 8.5$, and the value of $TTL/(T5+G3)$ may preferably be within about 4.50~8.50; $T2/T4 \le 2.2$, and the value of $T2/T4$ may preferably be within about 1.00~2.20; $T5/T3 \ge 0.7$, and the value of $T5/T3$ may preferably be within about 0.70~1.50; $TL/(T5+G3) \le 6.8$, and the value of $TL/(T5+G3)$ may preferably be within about 4.00~6.80; $(T1+G2)/G1 \le 2$, and the value of $(T1+G2)/G1$ may preferably be within about 0.50~2.00; $G1/T1 \ge 0.8$, and the value of $G1/T1$ may preferably be within about 0.80~2.00; $TL/(G1+T5) \le 3.3$, and the value of $TL/(G1+T5)$ may preferably be within about 2.00~3.30; $ALT/(G1+T5) \le 2.2$, and the value of $ALT/(G1+T5)$ may preferably be within about 1.50~2.20; $ALT/(T4+G3) \le 9.2$, and the value of $ALT/(T4+G3)$ may preferably be within about 6.00~9.20; $TTL/(T4+G3) \le 16$, and the value of $TTL/(T4+G3)$ may preferably be within about 11.00~16.00; $TTL/(G1+T5) \le 3.8$, and the value of $TTL/(G1+T5)$ may preferably be within about 2.50~3.80; $T2/T5 \le 1$, and the value of $T2/T5$ may preferably be within about 0.30~1.00; $(T5+G3)/G2 \ge 1.5$, and the value of $(T5+G3)/G2$ may preferably be within about 1.50~4.00; $(T5+G2)/T4 \le 5.5$, and the value of $(T5+G2)/T4$ may preferably be within about 2.50~5.50; and/or $ALT/T4 \le 13.5$, and the value of $ALT/T4$ may preferably be within about 7.00~13.50.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface could be incorporated for one specific lens element or broadly for plural lens elements to enhance the control for the system performance and/or resolution, or promote the yield. It is noted that the details listed here could be incorporated in example embodiments if no inconsistency occurs.

Figure 6:
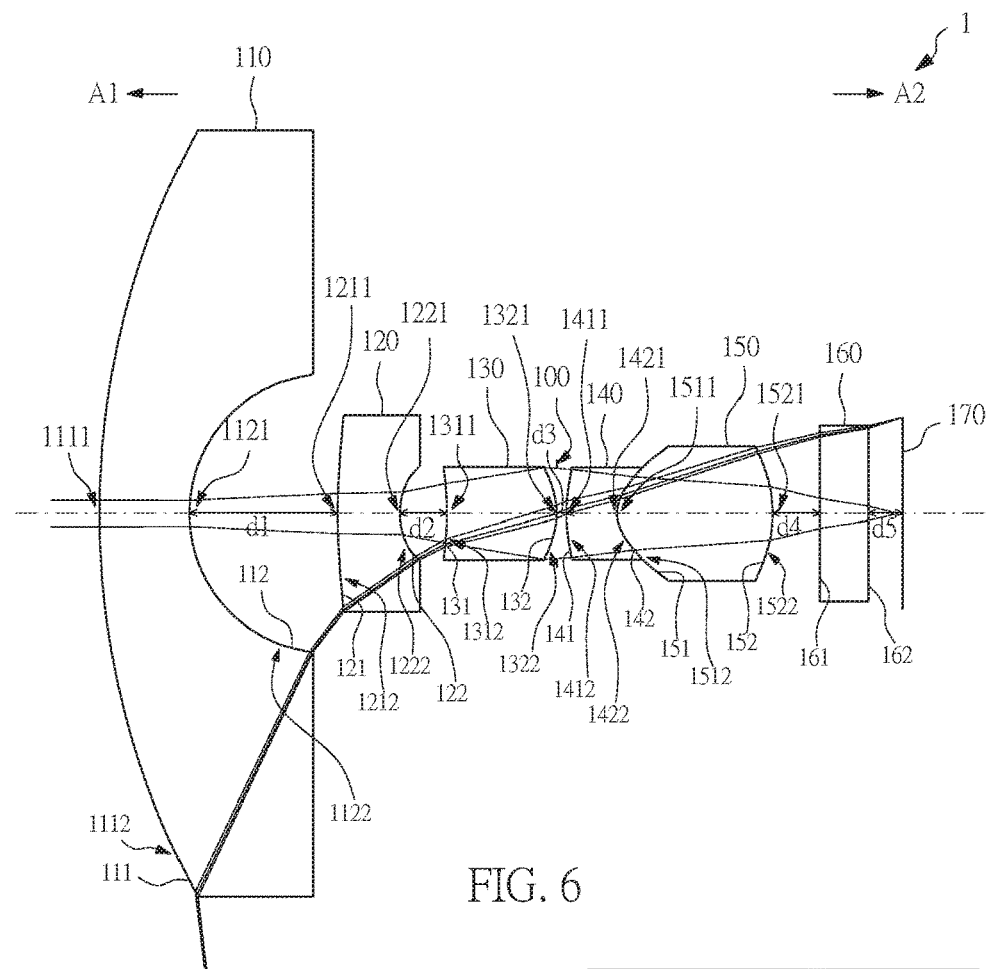
FIG. 6 depicts a cross-sectional view of a first embodiment of an optical imaging lens having five lens elements according to the present disclosure.
Figure 7:
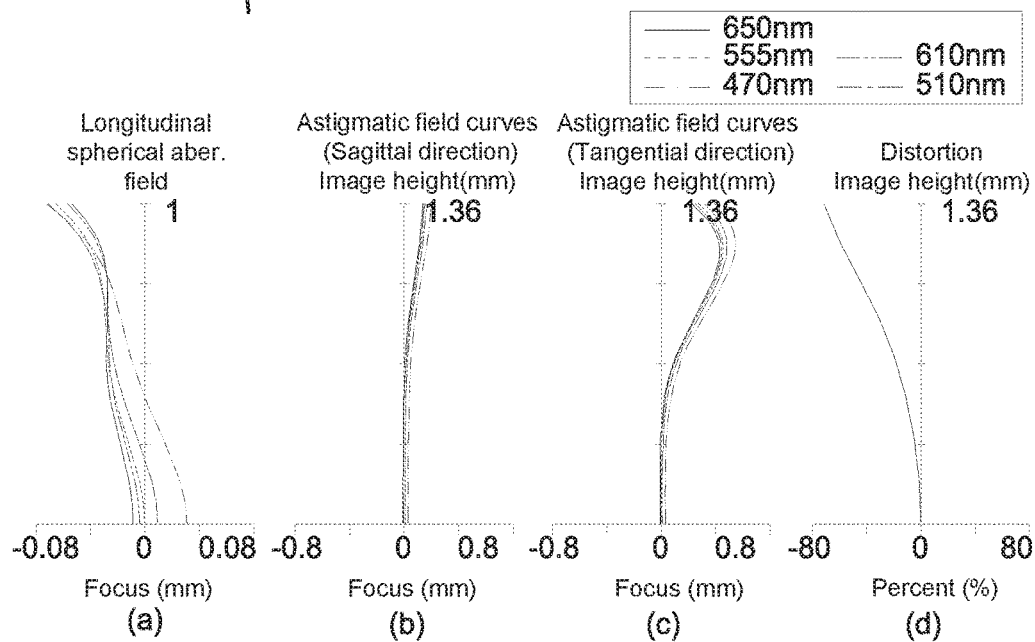
FIG. 7 depicts a chart of longitudinal spherical aberration and other kinds of optical aberrations of a first embodiment of the optical imaging lens according to the present disclosure.

Several example embodiments and associated optical data will now be provided for illustrating example embodiments of an optical imaging lens with good optical characteristics, a wide view angle and a low f-number. Reference is now made to FIGS. 6-9. FIG. 6 illustrates an example cross-sectional view of an optical imaging lens 1 having five lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, a third lens element 130, an aperture stop 100, a fourth lens element 140 and a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 illustrated may be an IR cut filter (infrared cut filter) positioned between the fifth lens element 150 and an image plane 170. The filtering unit 160 selectively absorbs light with specific wavelength from the light passing optical imaging lens 1. For example, IR light may be absorbed, and this may prohibit the IR light which is not seen by human eyes from producing an image on the image plane 170.

Please note that during the normal operation of the optical imaging lens 1, the distance between any two adjacent lens elements of the first, second, third, fourth and fifth lens elements 110, 120, 130, 140, 150 is a unchanged value, i.e. the optical imaging lens 1 is a prime lens.

Example embodiments of each lens element of the optical imaging lens 1 which may be constructed by glass, plastic material or other transparent material will now be described with reference to the drawings.

An example embodiment of the first lens element 110, which is constructed by plastic material, has negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which is constructed by plastic material, has negative refracting power. The object-side surface 121 may be a convex surface comprising a convex portion 1211 in a vicinity of the optical axis and a convex portion 1212 in a vicinity of a periphery of the second lens element 120. The image-side surface 122 may be a concave surface comprising a concave portion 1221 in a vicinity of the optical axis and a concave portion 1222 in a vicinity of the periphery of the second lens element 120.

An example embodiment of the third lens element 130, which is constructed by plastic material, has positive refracting power. The object-side surface 131 may be a concave surface comprising a concave portion 1311 in a vicinity of the optical axis and a concave portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140, which is constructed by plastic material, has negative refracting power. The object-side surface 141 may be a convex surface comprising a convex portion 1411 in a vicinity of the optical axis and a convex portion 1412 in a vicinity of a periphery of the fourth lens element 140. The image-side surface 142 may be a concave surface comprising a concave portion 1421 in a vicinity of the optical axis and a concave portion 1422 in a vicinity of the periphery of the fourth lens element 140.

An example embodiment of the fifth lens element 150, which is constructed by plastic material, has positive refracting power. The object-side surface 151 may be a convex surface comprising a convex portion 1511 in a vicinity of the optical axis and a convex portion 1512 in a vicinity of a periphery of the fifth lens element 150. The image-side surface 152 may be a convex surface comprising a convex portion 1521 in a vicinity of the optical axis and a convex portion 1522 in a vicinity of the periphery of the fifth lens element 150.

In example embodiments, air gaps may exist between each pair of lens elements, except the fourth and fifth lens elements 140, 150. In example embodiments, air gaps exist between the first and second lens elements 110, 120, the second and third lens elements 120, 130, the third and fourth lens elements, 130, 140, the fifth lens element 150 and the filtering unit 160, and the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fifth lens element 150 and the filtering unit 160 and the air gap d5 existing between the filtering unit 160 and the image plane 170 of the image sensor. The profiles of opposite surfaces of the fourth lens element 140 and the fifth lens element 150 may correspond to each other, and in such situations, the air gap may not exist. The air gap d1 is denoted by G1, the air gap d2 is denoted by G2, the air gap d3 is denoted by G3, and the sum of d1, d2 and d3 is denoted by Gaa. Please note, in other embodiments, any of the aforementioned air gaps may or may not exist.

FIG. 8 depicts the optical characteristics of each lens elements in the optical imaging lens 1 of the present embodiment, and please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 corresponding to the present embodiment. The distance from the object-side surface 111 of the first lens element 110 to the image plane 170 along the optical axis may be about 11.634 mm, the effective focal length (EFL) may be about 0.864 mm, image height may be about 1.362 mm, half field of view angle (HFOV) may be about 103.5 degrees, and f-number (Fno) may be about 2.2. Compared with conventional lens systems, the optical imaging lens 1 may be capable of providing excellent imaging quality for smaller sized mobile devices and greater HFOV.

The aspherical surfaces, including the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, are all defined by the following aspherical formula:

$$Z(Y) = \frac{Y^2}{R} \left/ \left(1 + \sqrt{1-(1+K)\frac{Y^2}{R^2}}\right) \right. + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9.

Please refer to FIG. 7(a), longitudinal spherical aberration of the optical imaging lens in the present embodiment is shown in coordinates in which the horizontal axis represents focus and the vertical axis represents field of view, and FIG. 7(b), astigmatism aberration of the optical imaging lens in the present embodiment in the sagittal direction is shown in coordinates in which the horizontal axis represents focus and the vertical axis represents image height, and FIG. 7(c), astigmatism aberration in the tangential direction of the optical imaging lens in the present embodiment is shown in coordinates in which the horizontal axis represents focus and the vertical axis represents image height, and FIG. 7(d), distortion aberration of the optical imaging lens in the present embodiment is shown in coordinates in which the horizontal axis represents percentage and the vertical axis represents image height. The curves of different wavelengths (470 nm, 510 nm, 555 nm, 610 nm, 650 nm) are closed to each other. This represents that off-axis light with respect to these wavelengths is focused around an image point. From the vertical deviation of each curve shown therein, the offset of the off-axis light relative to the image point may be within about ±0.08 mm. Therefore, the present embodiment improves the longitudinal spherical aberration with respect to different wavelengths. For astigmatism aberration in the sagittal direction, the focus variation with respect to the three wavelengths in the whole field may fall within about ±0.4 mm, for astigmatism aberration in the tangential direction, the focus variation with respect to the three wavelengths in the whole field may fall within about ±0.8 mm, and the variation of the distortion aberration may be within about ±80%.

According to the value of the aberrations, it is shown that the optical imaging lens 1 of the present embodiment, with the length as short as about 11.634 mm and HFOV as great as about 103.5 degrees, may be capable of providing good imaging quality as well as good optical characteristics.

Figure 10:
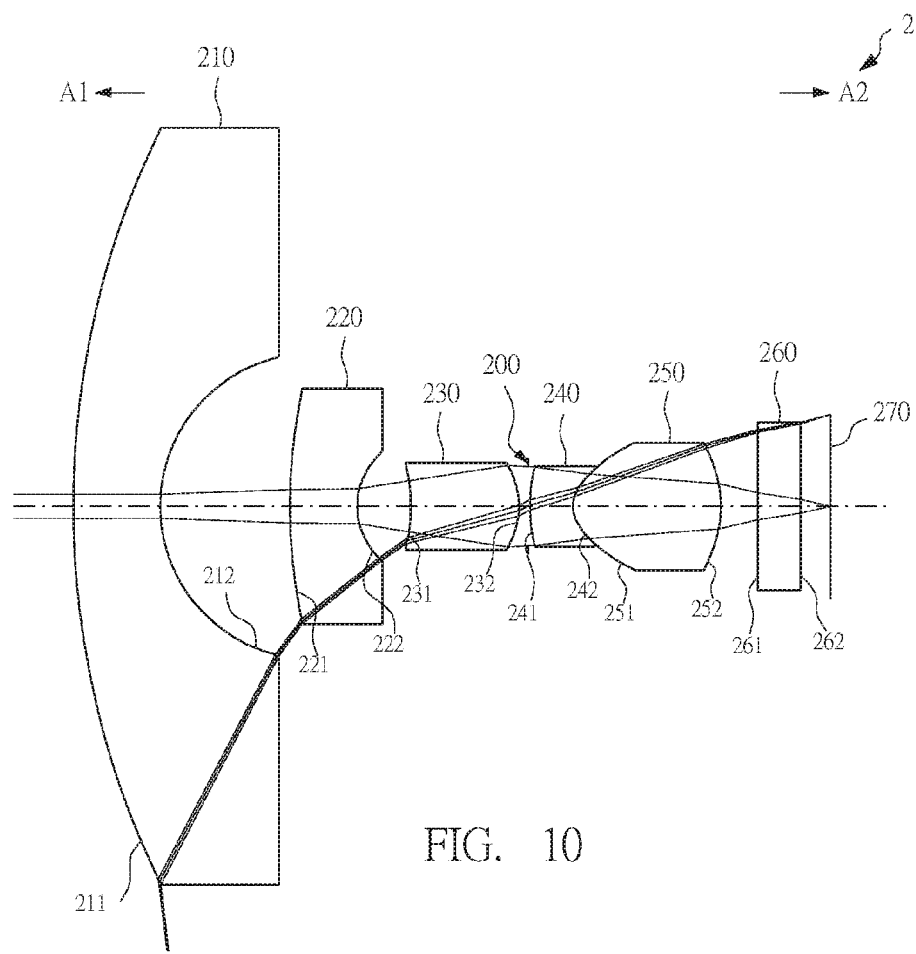
FIG. 10 depicts a cross-sectional view of a second embodiment of an optical imaging lens having five lens elements according to the present disclosure.
Figure 11:
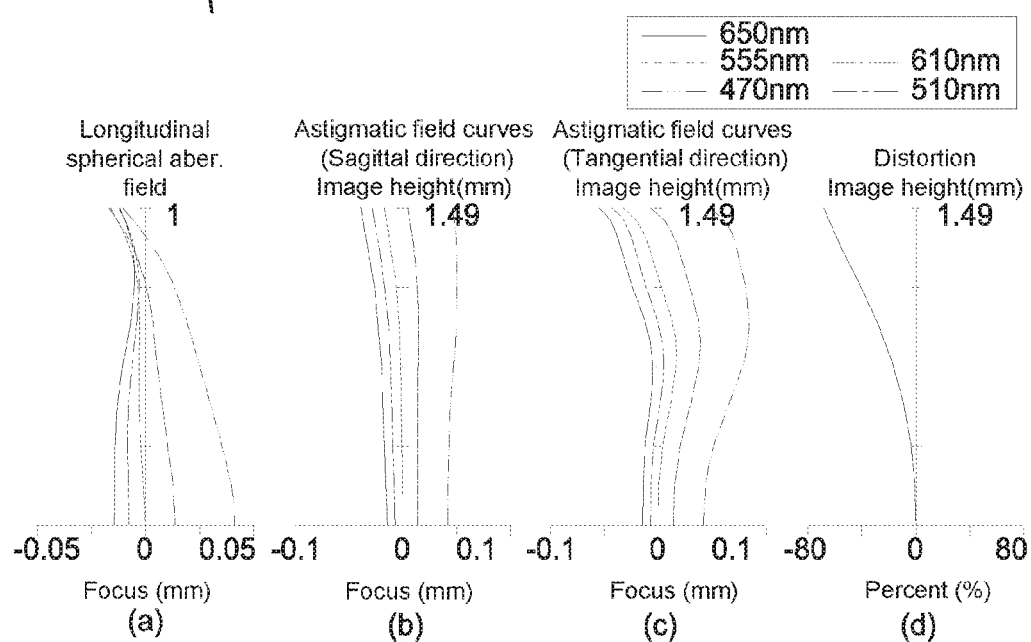
FIG. 11 depicts a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, a third lens element 230, an aperture stop 200, a fourth lens element 240 and a fifth lens element 250.

The differences between the second embodiment and the first embodiment include the radius of curvature, thickness of each lens element, the distance of each air gap, aspherical data, and related optical parameters, such as back focal length; but the configuration of the concave/convex shape of surfaces, comprising the object-side surfaces 211, 221, 231, 241, 251 facing to the object side A1 and the image-side surfaces 212, 222, 232, 242, 252 facing to the image side A2, are similar to those in the first embodiment. Here and in the embodiments hereinafter, for clearly showing the drawings of the present embodiment, only the surface shapes which are different from that in the first embodiment are labeled. Please refer to FIG. 12 for the optical characteristics of each lens elements in the optical imaging lens 2 the present embodiment, and please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 211 of the first lens element 210 to the image plane 270 along the optical axis may be about 12.441 mm, the image height may be about 1.495 mm, EFL may be about 0.874 mm, HFOV may be about 103.5 degrees, and Fno may be about 2.2.

As illustrated by the longitudinal spherical aberration shown in FIG. 11(a), the offset of the off-axis light relative to the image point may be within about ±0.05 mm. As illustrated by the astigmatism aberration in the sagittal direction shown in FIG. 11(b), the focus variation with respect to the three wavelengths in the whole field may fall within about ±0.1 mm. As illustrated by the astigmatism aberration in the tangential direction shown in FIG. 11(c), the focus variation with respect to the three wavelengths in the whole field may fall within about ±0.1 mm. As shown in FIG. 11(d), the variation of the distortion aberration may be within about ±80%.

Compared with the first embodiment, the longitudinal spherical aberration and astigmatism aberration both in the sagittal and tangential directions of the optical imaging lens 2 may be less. According to the value of the aberrations, it is shown that the optical imaging lens 2 of the present embodiment, with the length as short as about 12.441 mm and HFOV as large as about 103.5 degrees, may be capable of providing good imaging quality as well as good optical characteristics.

Figure 14:
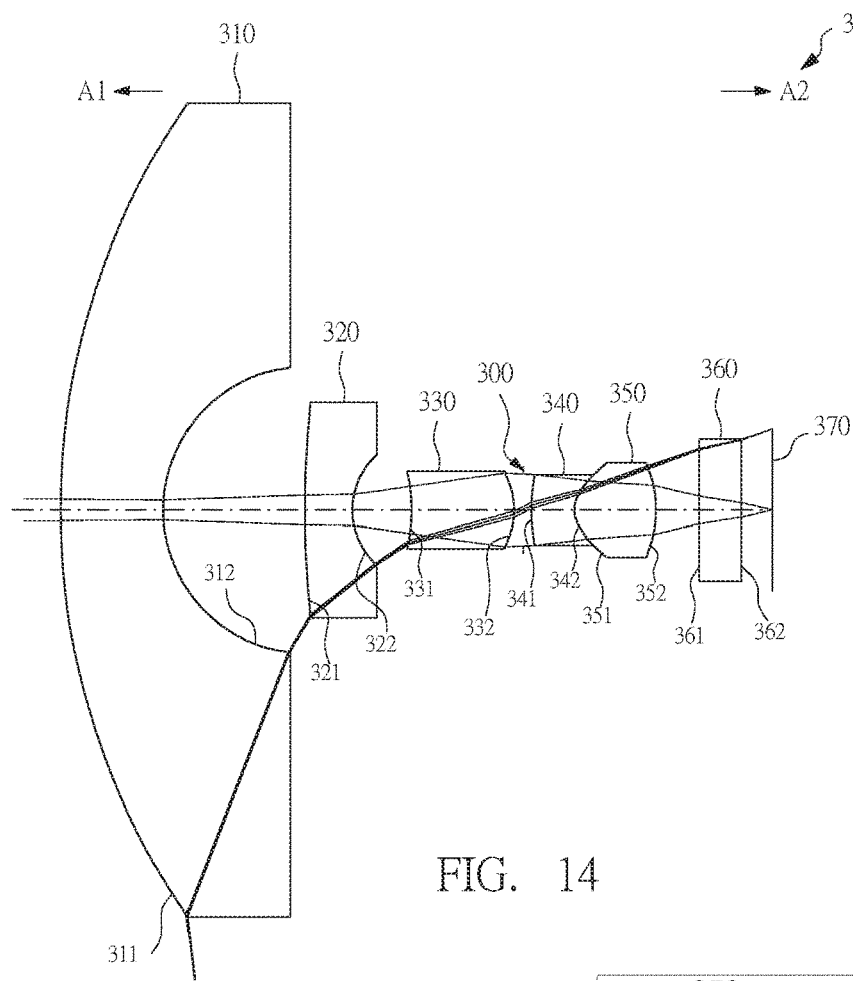
FIG. 14 depicts a cross-sectional view of a third embodiment of an optical imaging lens having five lens elements according to the present disclosure.
Figure 15:
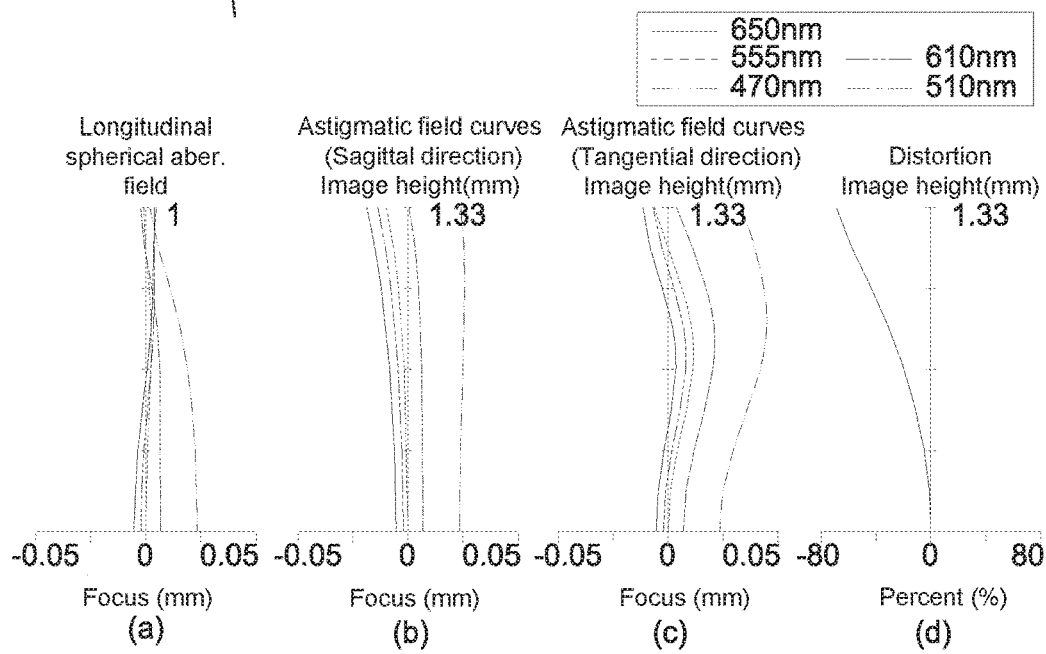
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, a third lens element 330, an aperture stop 300, a fourth lens element 340 and a fifth lens element 350.

The differences between the third embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 311, 321, 331, 341, 351 facing to the object side A1 and the image-side surfaces 312, 322, 332, 342, 352 facing to the image side A2, are similar to those in the first embodiment. Please refer to FIG. 16 for the optical characteristics of each lens elements in the optical imaging lens 3 of the present embodiment, and please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 311 of the first lens element 310 to the image plane 370 along the optical axis may be about 11.802 mm, the image height may be about 1.326 mm, EFL may be about 0.772 mm, HFOV may be about 103.5 degrees, and Fno may be about 2.2.

As illustrated by the longitudinal spherical aberration shown in FIG. 15(*a*), the offset of the off-axis light relative to the image point may be within about ±0.025 mm. As illustrated by the astigmatism aberration in the sagittal direction shown in FIG. 15(*b*), the focus variation with respect to the three wavelengths in the whole field may fall within about ±0.025 mm. As illustrated by the astigmatism aberration in the tangential direction shown in FIG. 15(*c*), the focus variation with respect to the three wavelengths in the whole field may fall within about +0.05 mm. As shown in FIG. 15(*d*), the variation of the distortion aberration may be within about ±80%.

Compared with the first embodiment, the longitudinal spherical aberration and the astigmatism aberrations both in the sagittal and tangential directions of the optical imaging lens 3 may be less. According to the value of the aberrations, it is shown that the optical imaging lens 3 of the present embodiment, with the length as short as about 11.802 mm and HFOV as large as about 103.5 degrees, may be capable of providing good imaging quality as well as good optical characteristics.

Figure 18:
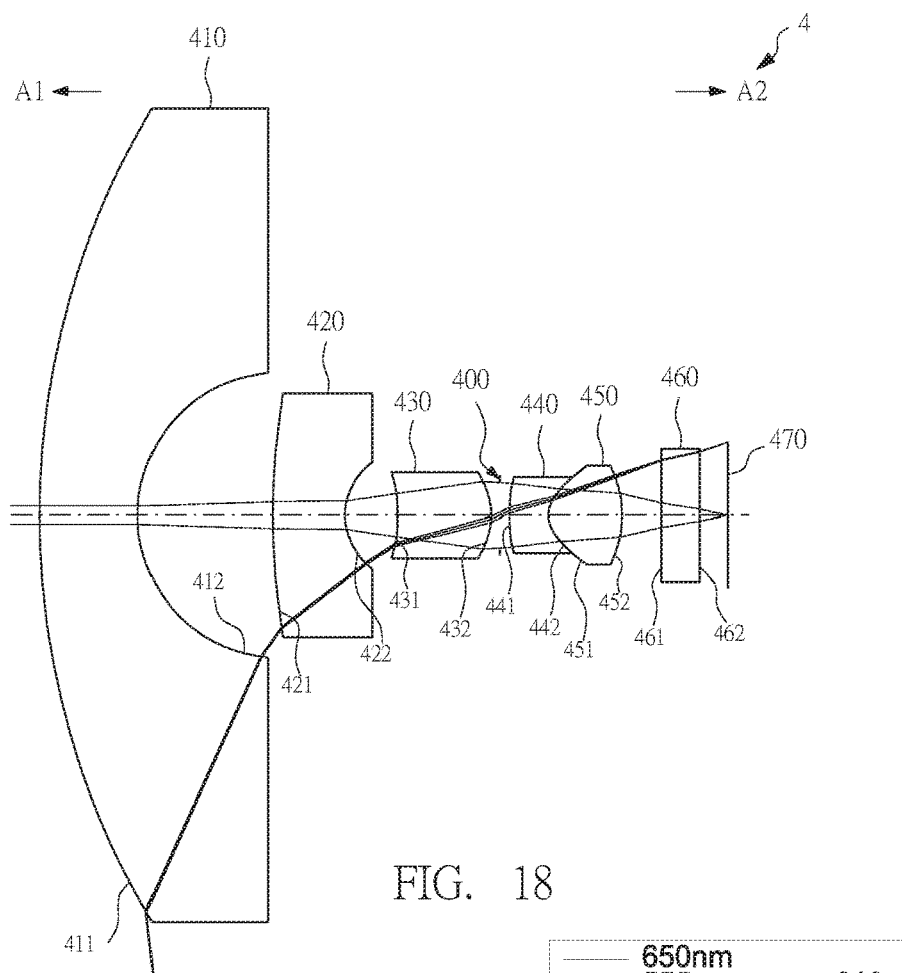
FIG. 18 depicts a cross-sectional view of a fourth embodiment of an optical imaging lens having five lens elements according to the present disclosure.
Figure 19:
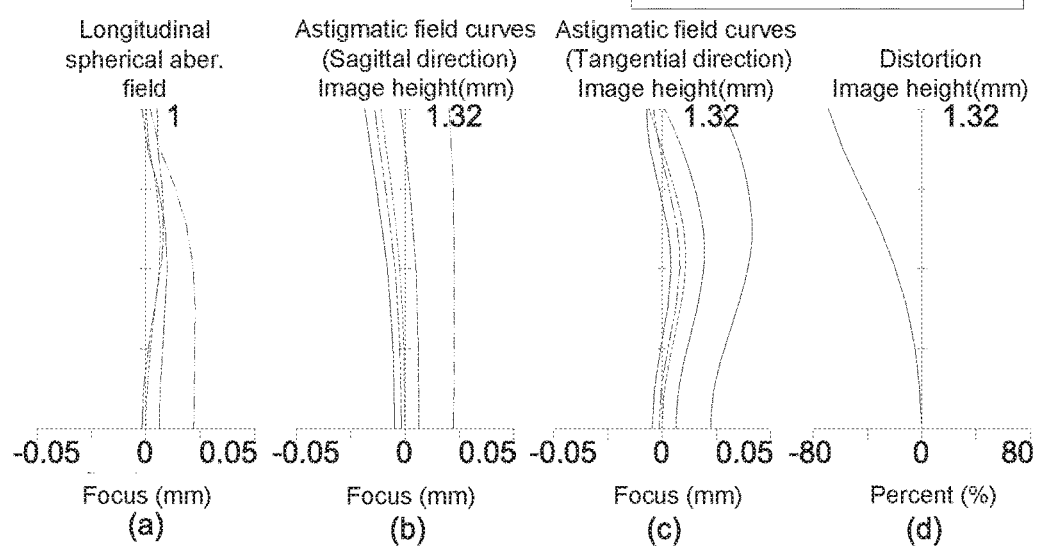
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, a third lens element 430, an aperture stop 400, a fourth lens element 44 and a fifth lens element 450.

The differences between the fourth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 411, 421, 431, 441, 451 facing to the object side A1 and the image-side surfaces 412, 422, 432, 442, 452 facing to the image side A2, are similar to those in the first embodiment. Please refer to FIG. 20 for the optical characteristics of each lens elements in the optical imaging lens 4 of the present embodiment, please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 411 of the first lens element 410 to the image plane 470 along the optical axis may be about 12.506 mm, the image height may be about 1.317 mm, EFL may be about 0.773 mm, HFOV may be about 103.5 degrees, and Fno may be about 2.2.

As illustrated by the longitudinal spherical aberration shown in FIG. 19(*a*), the offset of the off-axis light relative to the image point may be within about ±0.025 mm. As illustrated by the astigmatism aberration in the sagittal direction shown in FIG. 19(*b*), the focus variation with respect to the three wavelengths in the whole field may fall within about ±0.025 mm. As illustrated by the astigmatism aberration in the tangential direction shown in FIG. 19(*c*), the focus variation with respect to the three wavelengths in the whole field may fall within about +0.05 mm. As shown in FIG. 19(*d*), the variation of the distortion aberration may be within about ±80%.

Compared with the first embodiment, the longitudinal spherical aberration and the astigmatism aberrations both in the sagittal and tangential directions of the optical imaging lens 4 may be less. According to the value of the aberrations, it is shown that the optical imaging lens 4 of the present embodiment, with the length as short as about 12.506 mm and HFOV as large as about 103.5 degrees, may be capable of providing good imaging quality as well as good optical characteristics.

Figure 22:
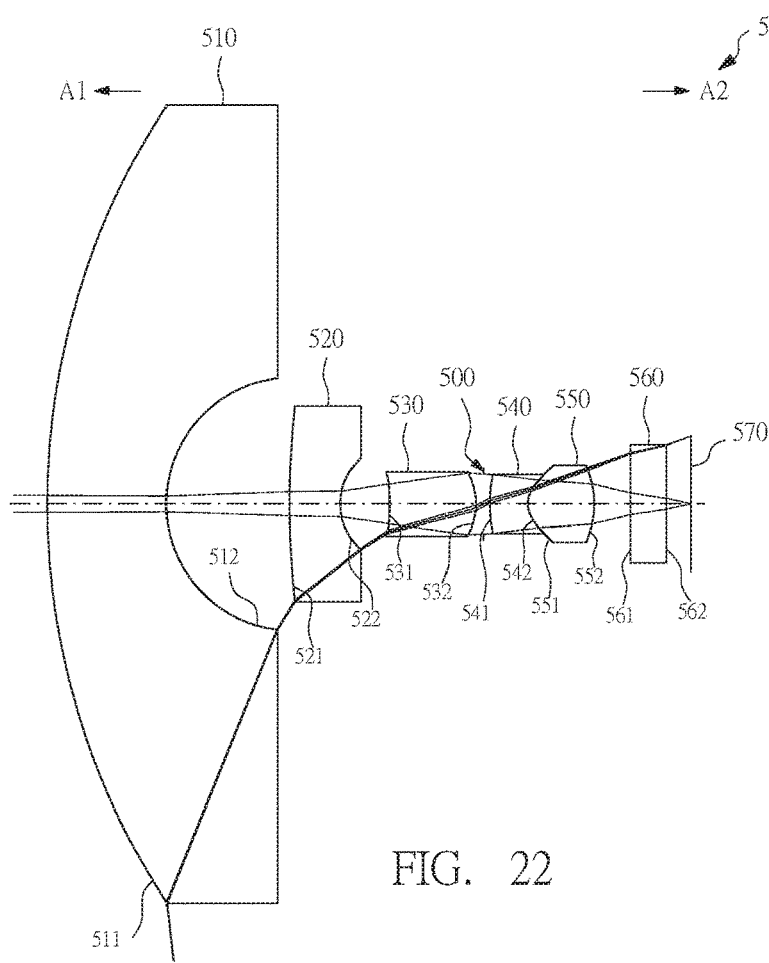
FIG. 22 depicts a cross-sectional view of a fifth embodiment of an optical imaging lens having five lens elements according to the present disclosure.
Figure 23:
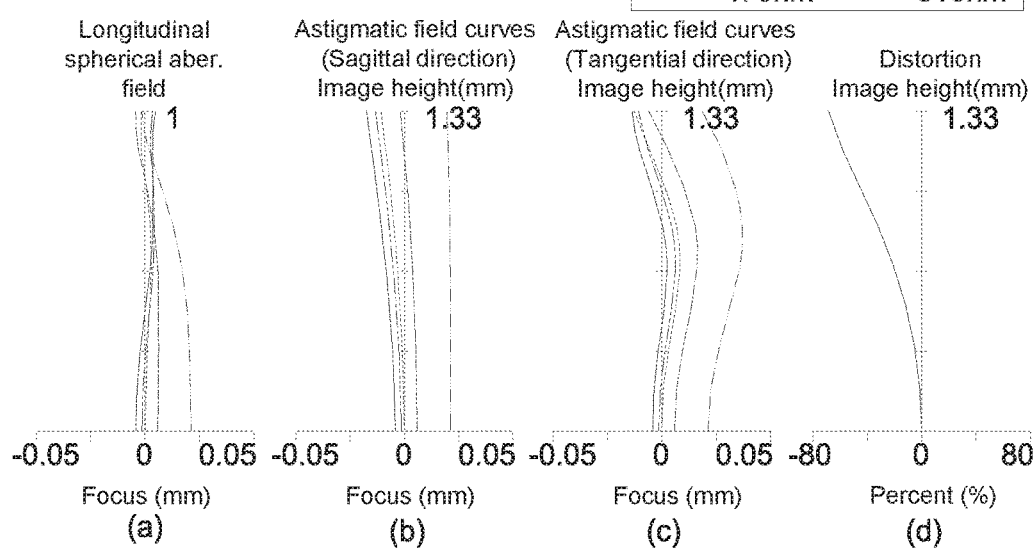
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, a third lens element 530, an aperture stop 500, a fourth lens element 540 and a fifth lens element 550.

The differences between the fifth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 511, 521, 531, 541, 551 facing to the object side A1 and the image-side surfaces 512, 522, 532, 542, 552 facing to the image side A2, are similar to those in the first embodiment. Please refer to FIG. 24 for the optical characteristics of each lens elements in the optical imaging lens 5 of the present embodiment, please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 511 of the first lens element 510 to the image plane 570 along the optical axis may be about 12.718 mm, the image height may be about 1.332 mm, EFL may be about 0.775 mm, HFOV may be about 103.5 degrees, and Fno may be about 2.2.

As illustrated by the longitudinal spherical aberration shown in FIG. 23(a), the offset of the off-axis light relative to the image point may be within about ±0.025 mm. As illustrated by the astigmatism aberration in the sagittal direction shown in FIG. 23(b), the focus variation with respect to the three wavelengths in the whole field may fall within about ±0.025 mm. As illustrated by the astigmatism aberration in the tangential direction shown in FIG. 23(c), the focus variation with respect to the three wavelengths in the whole field may fall within about +0.05 mm. As shown in FIG. 23(d), the variation of the distortion aberration may be within about ±80%.

Compared with the first embodiment, the longitudinal spherical aberration and the astigmatism aberrations both in the sagittal and tangential directions of the optical imaging lens 5 may be less. According to the value of the aberrations, it is shown that the optical imaging lens 5 of the present embodiment, with the length as short as about 12.718 mm and HFOV as large as about 103.5 degrees, may be capable of providing good imaging quality as well as good optical characteristics.

Figure 26:
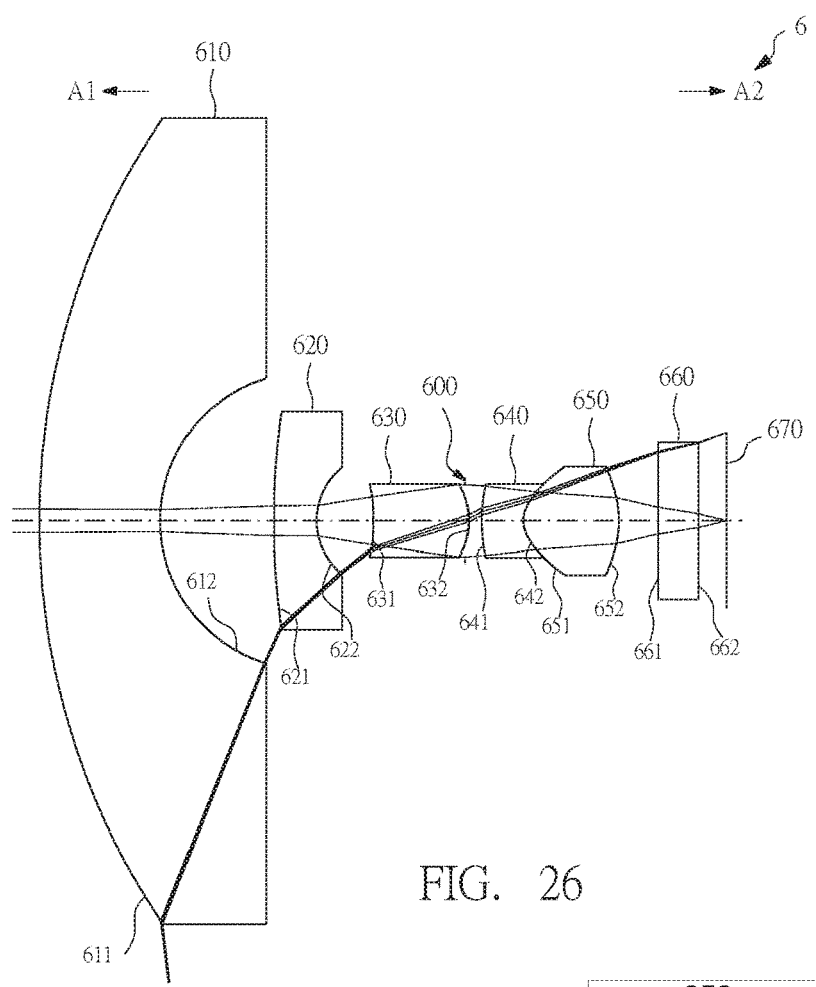
FIG. 26 depicts a cross-sectional view of a sixth embodiment of an optical imaging lens having five lens elements according to the present disclosure.
Figure 27:
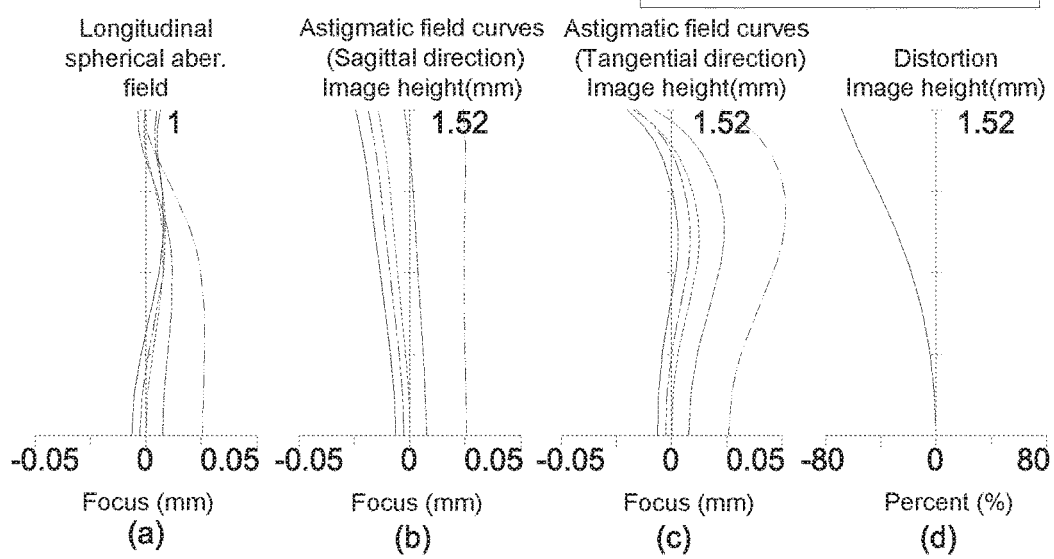
FIG. 27 depicts a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, a third lens element 630, an aperture stop 600, a fourth lens element 640 and a fifth lens element 650.

The differences between the sixth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 611, 621, 631, 641, 651 facing to the object side A1 and the image-side surfaces 612, 622, 632, 642, 652 facing to the image side A2, are similar to those in the first embodiment. Please refer to FIG. 28 for the optical characteristics of each lens elements in the optical imaging lens 6 of the present embodiment, please refer to FIG. 54A for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 611 of the first lens element 610 to the image plane 670 along the optical axis may be about 12.027 mm, the image height may be about 1.515 mm, EFL may be about 0.873 mm, HFOV may be about 103.5 degrees, and Fno may be about 2.2.

As illustrated by the longitudinal spherical aberration shown in FIG. 27(a), the offset of the off-axis light relative to the image point may be within about ±0.05 mm. As illustrated by the astigmatism aberration in the sagittal direction shown in FIG. 27(b), the focus variation with respect to the three wavelengths in the whole field may fall within about ±0.05 mm. As illustrated by the astigmatism aberration in the tangential direction shown in FIG. 27(c), the focus variation with respect to the three wavelengths in the whole field may fall within about +0.05 mm. As shown in FIG. 27(d), the variation of the distortion aberration may be within about ±80%.

Compared with the first embodiment, the longitudinal spherical aberration and astigmatism aberrations both in the sagittal and tangential directions may be less. According to the value of the aberrations, it is shown that the optical imaging lens 6 of the present embodiment, with the length as short as about 12.027 mm and HFOV as large as about 103.5 degrees, may be capable of providing good imaging quality as well as good optical characteristics.

Figure 30:
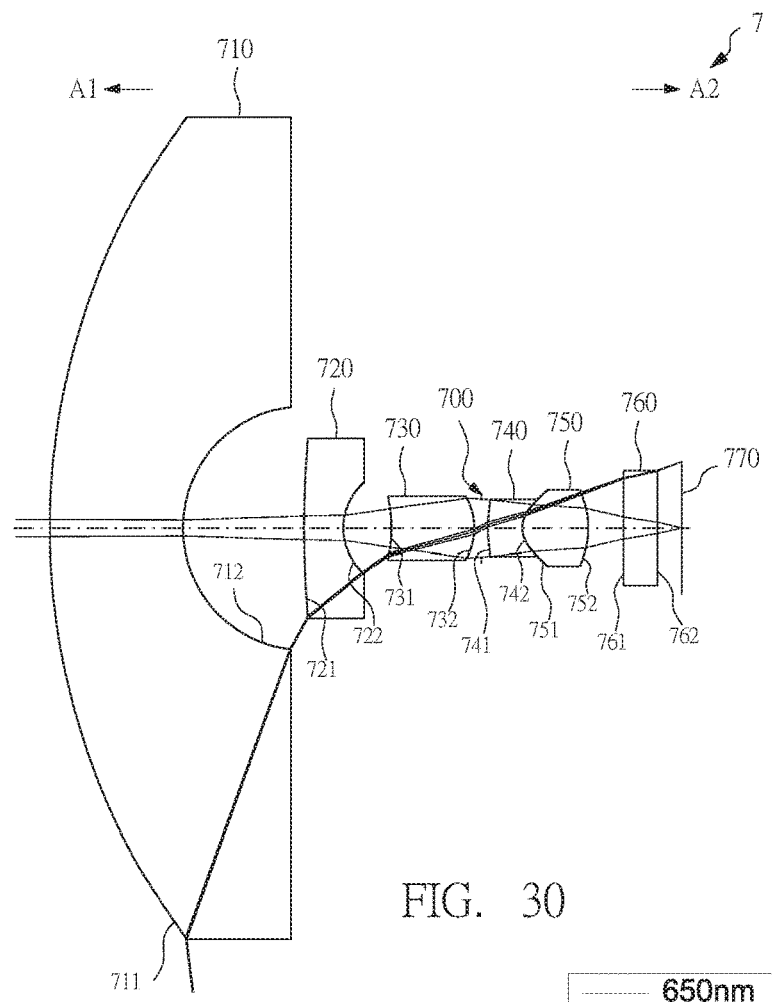
FIG. 30 depicts a cross-sectional view of a seventh embodiment of an optical imaging lens having five lens elements according to the present disclosure.
Figure 31:
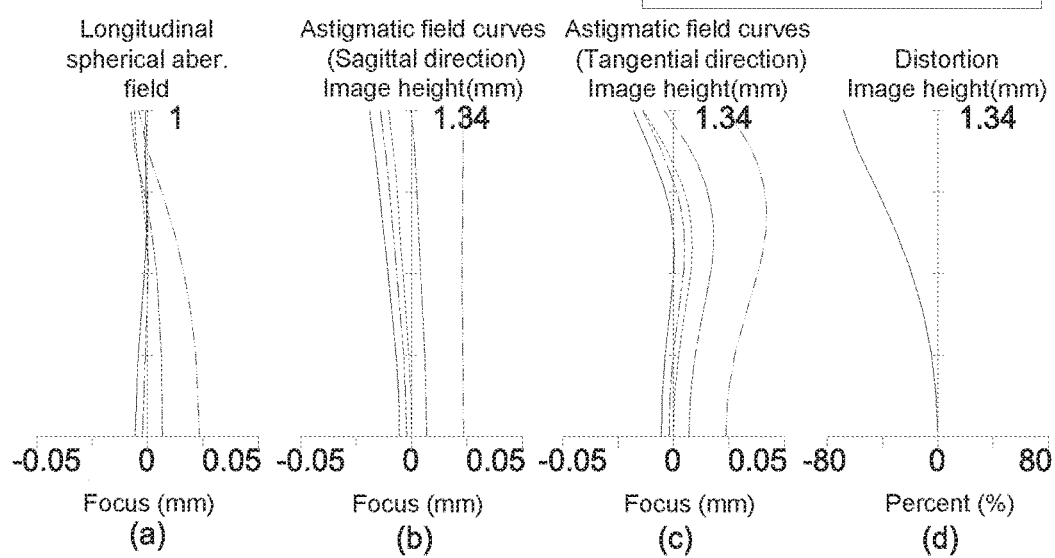
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, a third lens element 730, an aperture stop 700, a fourth lens element 740 and a fifth lens element 750.

The differences between the seventh embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 711, 721, 731, 741, 751 facing to the object side A1 and the image-side surfaces 712, 722, 732, 742, 752 facing to the image side A2, are similar to those in the first embodiment, and the fourth lens element 740 has positive refracting power. Please refer to FIG. 32 for the optical characteristics of each lens elements in the optical imaging lens 7 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 711 of the first lens element 710 to the image plane 770 along the optical axis may be about 12.918 mm, the image height may be about 1.337 mm, EFL may be about 0.779 mm, HFOV may be about 103.5 degrees, and Fno may be about 2.2.

As illustrated by the longitudinal spherical aberration shown in FIG. 31(a), the offset of the off-axis light relative to the image point may be within about ±0.025 mm. As illustrated by the astigmatism aberration in the sagittal direction shown in FIG. 31(b), the focus variation with respect to the three wavelengths in the whole field may fall within about ±0.025 mm. As illustrated by the astigmatism aberration in the tangential direction shown in FIG. 31(c), the focus variation with respect to the three wavelengths in the whole field may fall within about +0.05 mm. As shown in FIG. 31(d), the variation of the distortion aberration may be within about ±80%.

Compared with the first embodiment, the longitudinal spherical aberration and the astigmatism aberrations both in the sagittal and tangential directions of the optical imaging lens 7 may be less. According to the value of the aberrations, it is shown that the optical imaging lens 7 of the present embodiment, with the length as short as about 12.918 mm and HFOV as large as about 103.5 degrees, may be capable of providing good imaging quality as well as good optical characteristics.

Figure 34:
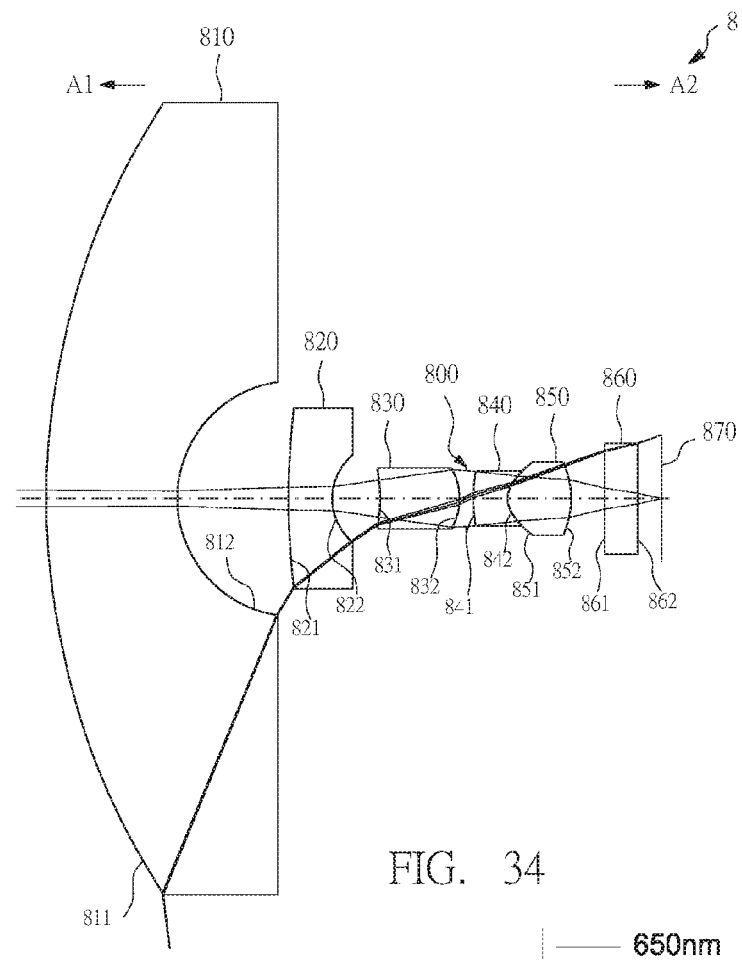
FIG. 34 depicts a cross-sectional view of an eighth embodiment of an optical imaging lens having five lens elements according to the present disclosure.
Figure 35:
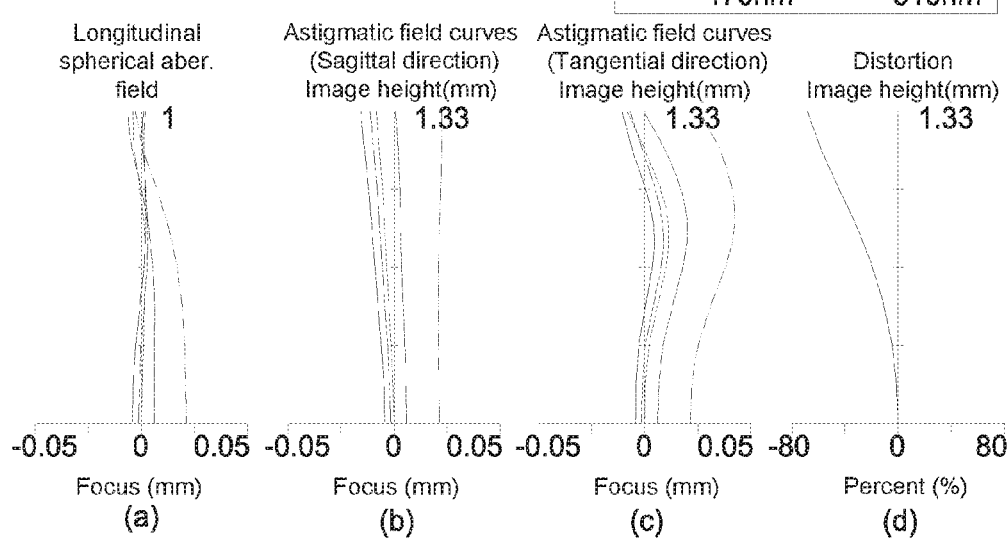
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having five lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, a third lens element 830, an aperture stop 800, a fourth lens element 840 and a fifth lens element 850.

The differences between the eighth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 811, 821, 831, 841, 851 facing to the object side A1 and the image-side surfaces 812, 822, 832, 842, 852 facing to the image side A2, are similar to those in the first embodiment, and the fourth lens element 840 has positive refracting power. Please refer to FIG. 36 for the optical characteristics of each lens elements in the optical imaging lens 8 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 811 of the first lens element 810 to the image plane 870 along the optical axis may be about 12.970 mm, the image height may be about 1.328 mm, EFL may be about 0.770 mm, HFOV may be about 103.5 degrees, and Fno may be about 2.2.

As illustrated by the longitudinal spherical aberration shown in FIG. 35(a), the offset of the off-axis light relative to the image point may be within about ±0.025 mm. As illustrated by the astigmatism aberration in the sagittal direction shown in FIG. 35(b), the focus variation with respect to the three wavelengths in the whole field may fall within about ±0.025 mm. As illustrated by the astigmatism aberration in the tangential direction shown in FIG. 35(c), the focus variation with respect to the three wavelengths in the whole field may fall within about ±0.05 mm. As shown in FIG. 35(d), the variation of the distortion aberration may be within about ±80%.

Compared with the first embodiment, the longitudinal spherical aberration and the astigmatism aberrations both in the sagittal and tangential directions of the optical imaging lens 8 may be less. According to the value of the aberrations, it is shown that the optical imaging lens 8 of the present embodiment, with the length as short as about 12.970 mm and HFOV as large as about 103.5 degrees, is capable to provide good imaging quality as well as good optical characteristics.

Figure 38:
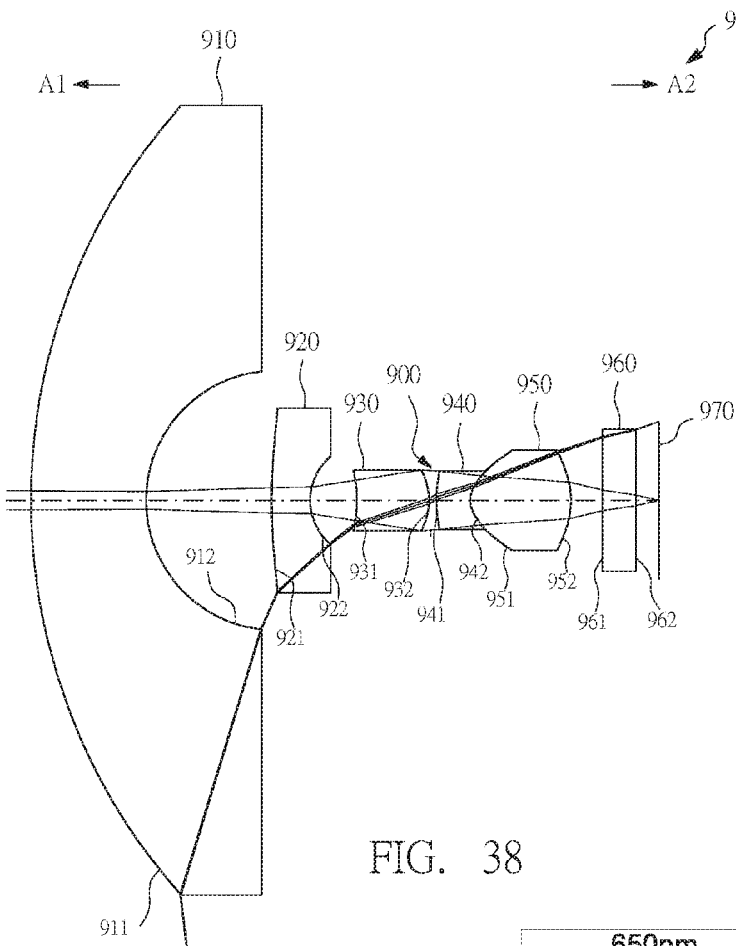
FIG. 38 depicts a cross-sectional view of a ninth embodiment of an optical imaging lens having five lens elements according to the present disclosure.
Figure 39:
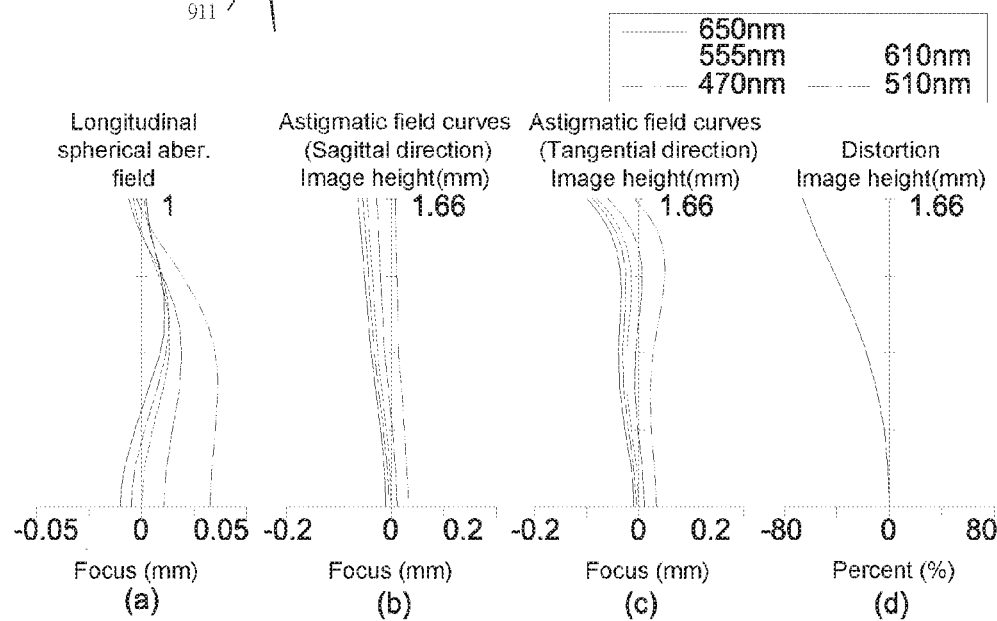
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having five lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, a third lens element 930, an aperture stop 900, a fourth lens element 940 and a fifth lens element 950.

The differences between the ninth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 911, 921, 931, 941, 951 facing to the object side A1 and the image-side surfaces 912, 922, 932, 942, 952 facing to the image side A2, are similar to those in the first embodiment. Please refer to FIG. 40 for the optical characteristics of each lens elements in the optical imaging lens 9 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 911 of the first lens element 910 to the image plane 970 along the optical axis may be about 13.363 mm, the image height may be about 1.656 mm, EFL may be about 0.894 mm, HFOV may be about 103.5 degrees, and Fno may be about 2.2.

As illustrated by the longitudinal spherical aberration shown in FIG. 39(a), the offset of the off-axis light relative to the image point may be within about ±0.05 mm. As illustrated by the astigmatism aberration in the sagittal direction shown in FIG. 39(b), the focus variation with respect to the three wavelengths in the whole field may fall within about ±0.1 mm. As illustrated by the astigmatism aberration in the tangential direction shown in FIG. 39(c), the focus variation with respect to the three wavelengths in the whole field may fall within about ±0.1 mm. As shown in FIG. 39(d), the variation of the distortion aberration may be within about ±80%.

Compared with the first embodiment, the longitudinal spherical aberration and the astigmatism aberrations both in the sagittal and tangential directions of the optical imaging lens 9 may be less. According to the value of the aberrations, it is shown that the optical imaging lens 9 of the present embodiment, with the length as short as about 13.363 mm and HFOV as large as 103.5 degrees, is capable to provide good imaging quality as well as good optical characteristics.

Figure 42:
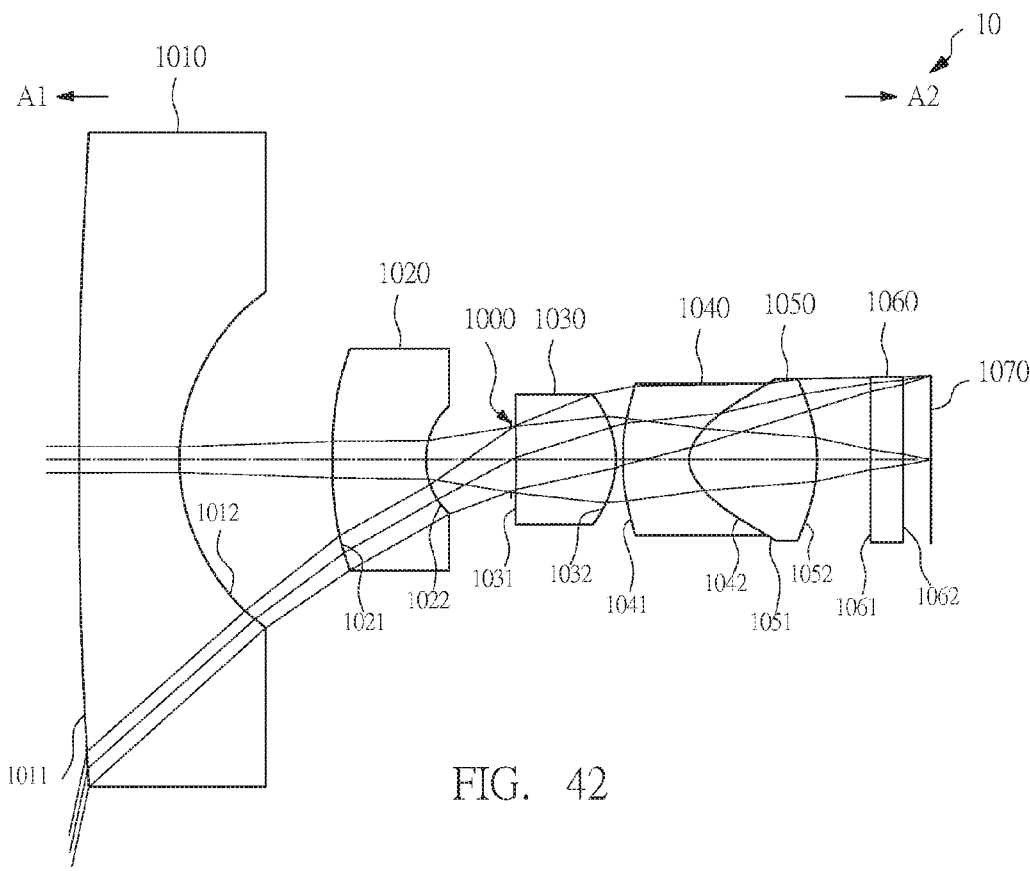
FIG. 42 depicts a cross-sectional view of a tenth embodiment of an optical imaging lens having five lens elements according to the present disclosure.
Figure 43:
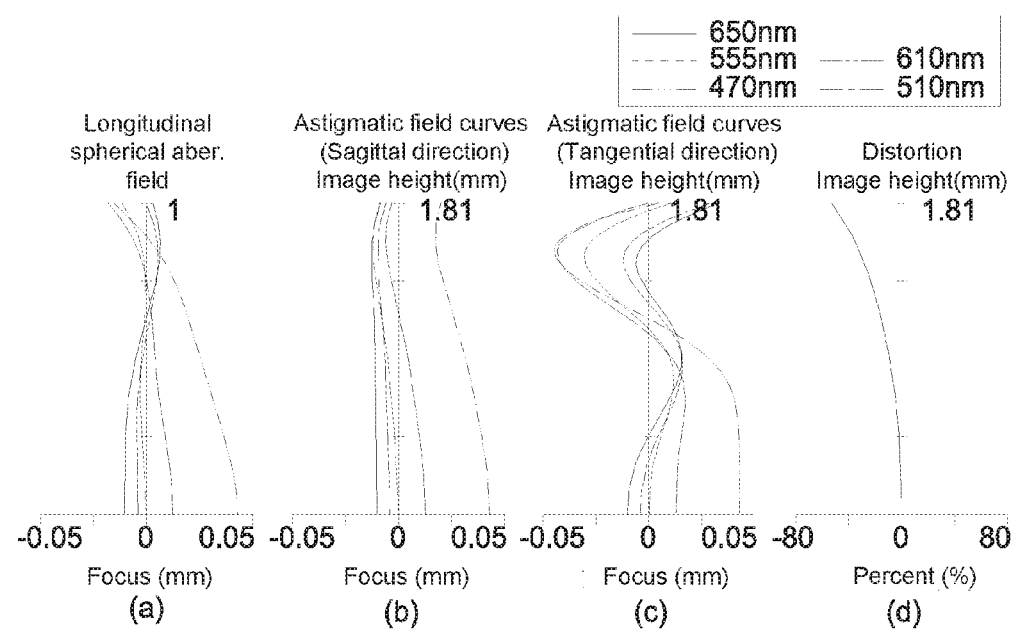
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having five lens elements of the optical imaging lens according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, a second lens element 1020, an aperture stop 1000, a third lens element 1030, a fourth lens element 1040 and a fifth lens element 1050.

The differences between the tenth embodiment and the first embodiment include the radius of curvature and thickness of each lens element, the distance of each air gap, aspherical data, and related optical parameters, such as back focal length; but the configuration of the concave/convex shape of surfaces, comprising the object-side surfaces 1011, 1021, 1031, 1041, 1051 facing to the object side A1 and the image-side surfaces 1012, 1022, 1032, 1042, 1052 facing to the image side A2, are similar to those in the first embodiment. Please refer to FIG. 44 for the optical characteristics of each lens elements in the optical imaging lens 10 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 1011 of the first lens element 1010 to the image plane 1070 along the optical axis may be about 18.355 mm, the image height may be about 1.8 mm, EFL may be about 1.384 mm, HFOV may be about 77.95, and Fno may be about 2.4.

As illustrated by the longitudinal spherical aberration shown in FIG. 43(a), the offset of the off-axis light relative to the image point may be within about ±0.05 mm. As illustrated by the astigmatism aberration in the sagittal direction shown in FIG. 43(b), the focus variation with respect to the three wavelengths in the whole field may fall within about ±0.05 mm. As illustrated by the astigmatism aberration in the tangential direction shown in FIG. 43(c), the focus variation with respect to the three wavelengths in the whole field may fall within about +0.05 mm. As shown in FIG. 43(d), the variation of the distortion aberration may be within about ±80%.

Compared with the first embodiment, the longitudinal spherical aberration and the astigmatism aberrations both in the sagittal and tangential directions of the optical imaging lens 10 may be less. According to the value of the aberrations, it is shown that the optical imaging lens 10 of the present embodiment, with the length as short as about 18.355 mm and HFOV as large as 77.95 degrees, is capable to provide good imaging quality as well as good optical characteristics.

Figure 46:
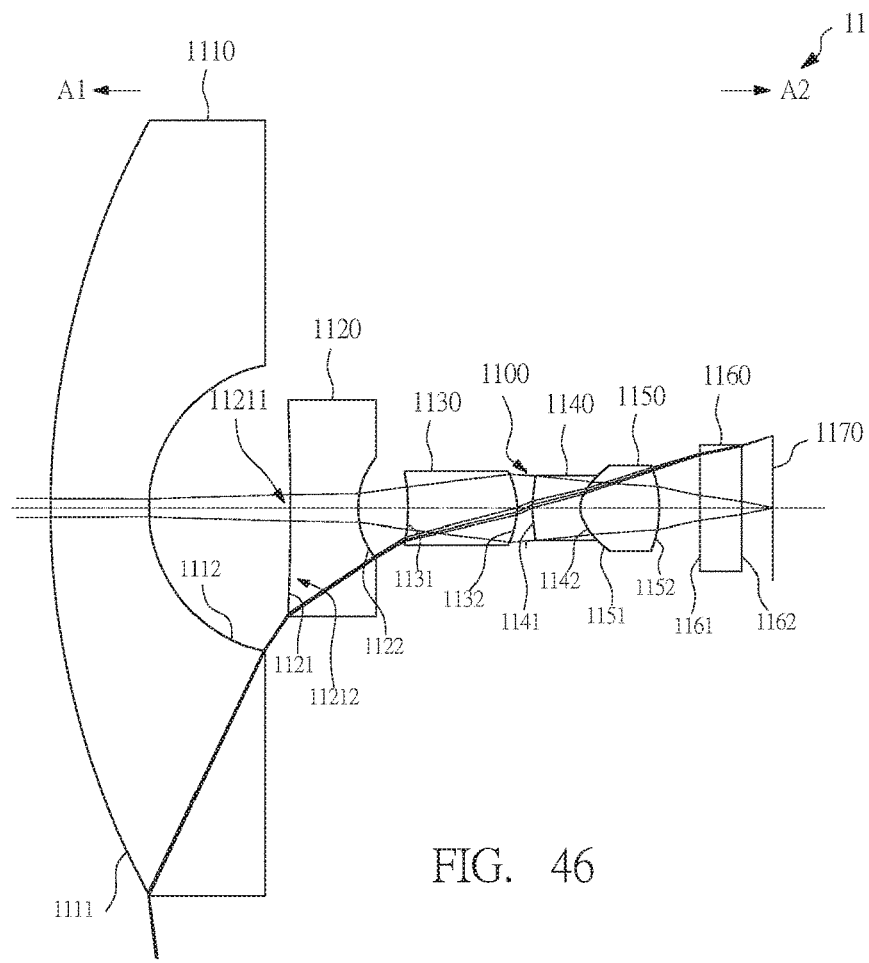
FIG. 46 depicts a cross-sectional view of an eleventh embodiment of an optical imaging lens having five lens elements according to the present disclosure.
Figure 47:
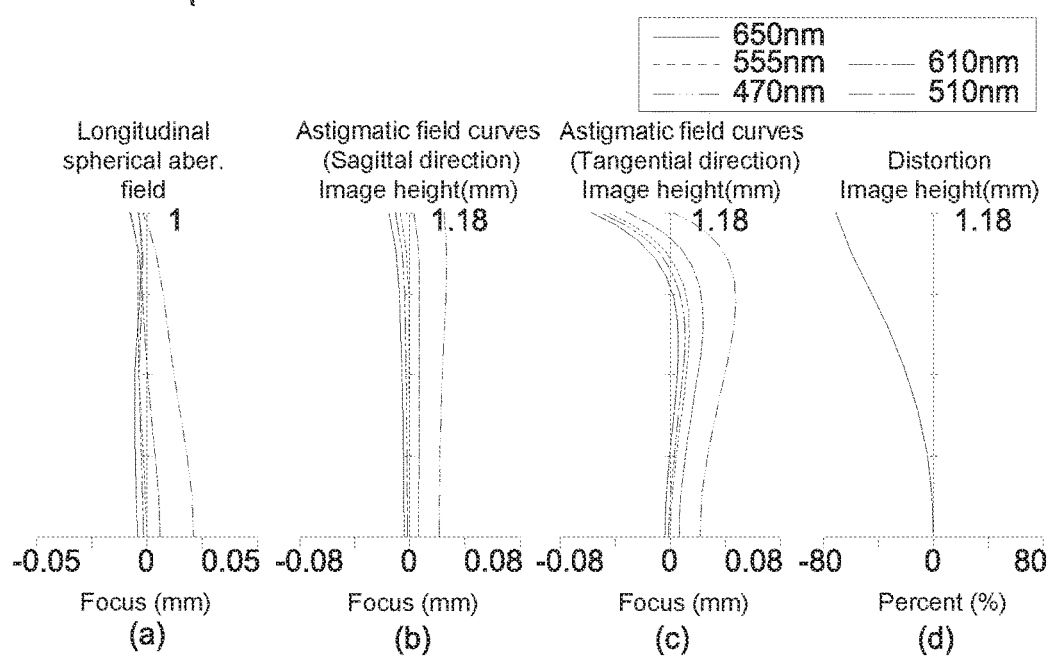
FIG. 47 depicts a chart of longitudinal spherical aberration and other kinds of optical aberrations of an eleventh embodiment of the optical imaging lens according the present disclosure.

Reference is now made to FIGS. 46-49. FIG. 46 illustrates an example cross-sectional view of an optical imaging lens 11 having five lens elements of the optical imaging lens according to an eleventh example embodiment. FIG. 47 shows example charts of longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment, in an order from an object side A1 to an image side A2 along an optical axis, may comprise a first lens element 1110, a second lens element 1120, a third lens element 1130, an aperture stop 1100, a fourth lens element 1140 and a fifth lens element 1150.

The differences between the eleventh embodiment and the first embodiment include the radius of curvature and thickness of each lens element, the distance of each air gap, aspherical data, related optical parameters, such as back focal length, and the configuration of the concave/convex shape of the object-side surface 1121; but the configuration of the concave/convex shape of surfaces, comprising the object-side surfaces 1111, 1131, 1141, 1151 facing to the object side A1 and the image-side surfaces 1112, 1122, 1132, 1142, 1152 facing to the image side A2, are similar to those in the first embodiment, and the fourth lens element 1140 has positive refracting power. Specifically, the object-side surface 1121 of the second lens element 1120 is a concave surface comprising a concave portion 11211 in a vicinity of the optical axis and a concave portion 11212 in a vicinity of a periphery of the second lens element 1120. Please refer to FIG. 48 for the optical characteristics of each lens elements in the optical imaging lens 11 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 1111 of the first lens element 1110 to the image plane 1170 along the optical axis may be about 11.992 mm, the image height may be about 1.179 mm, EFL may be about 0.749 mm, HFOV may be about 103.5 degrees, and Fno may be about 2.4.

As illustrated by the longitudinal spherical aberration shown in FIG. 47(a), the offset of the off-axis light relative to the image point may be within about ±0.025 mm. As illustrated by the astigmatism aberration in the sagittal direction shown in FIG. 47(b), the focus variation with respect to the three wavelengths in the whole field may fall within about ±0.04 mm. As illustrated by the astigmatism aberration in the tangential direction shown in FIG. 47(c), the focus variation with respect to the three wavelengths in the whole field may fall within about ±0.08 mm. As shown in FIG. 47(d), the variation of the distortion aberration may be within about ±80%.

Compared with the first embodiment, the longitudinal spherical aberration and the astigmatism aberrations both in the sagittal and tangential directions of the optical imaging lens 11 may be less. According to the value of the aberrations, it is shown that the optical imaging lens 11 of the present embodiment, with the length as short as about 11.992 mm and HFOV as large as about 103.5 degrees, is capable to provide good imaging quality as well as good optical characteristics.

Figure 50:
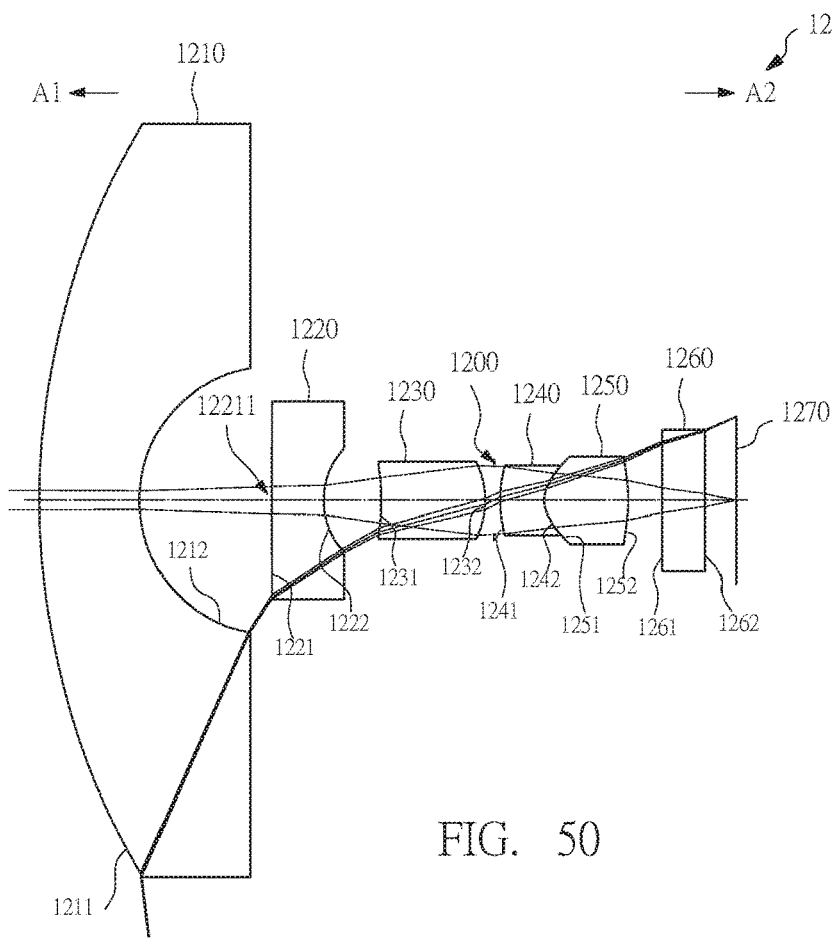
FIG. 50 depicts a cross-sectional view of a twelfth embodiment of an optical imaging lens having five lens elements according to the present disclosure.
Figure 51:
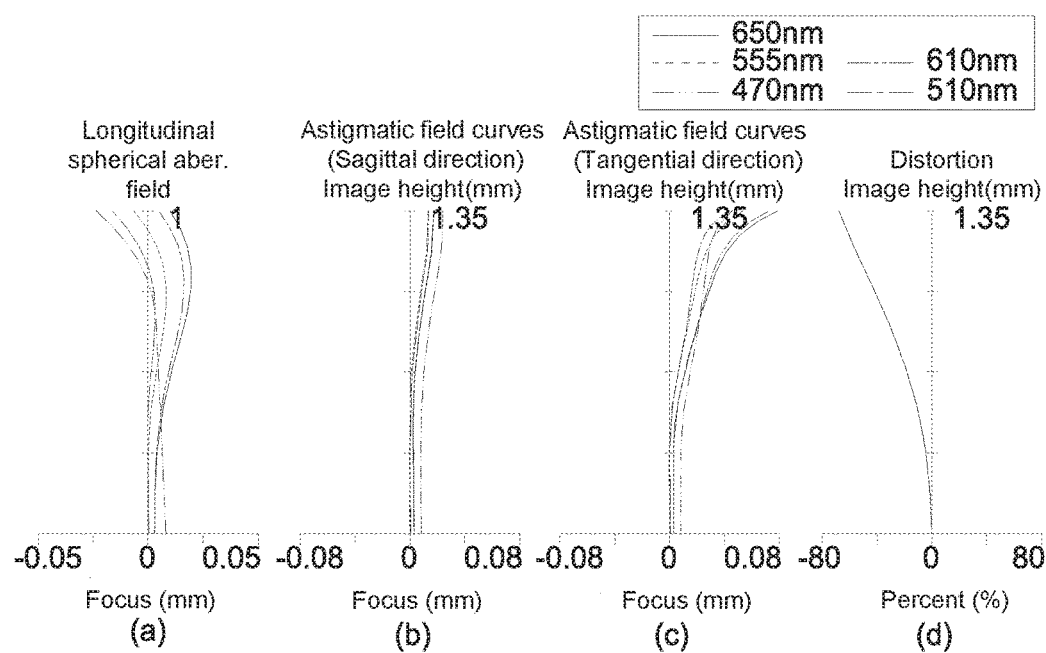
FIG. 51 depicts a chart of longitudinal spherical aberration and other kinds of optical aberrations of a twelfth embodiment of the optical imaging lens according the present disclosure.

Reference is now made to FIGS. 50-53. FIG. 50 illustrates an example cross-sectional view of an optical imaging lens 12 having five lens elements of the optical imaging lens according to an twelfth example embodiment. FIG. 51 shows example charts of longitudinal spherical aberration and other kinds of optical aberrations of the optical imaging lens 12 according to the twelfth embodiment. FIG. 52 shows an example table of optical data of each lens element of the optical imaging lens 12 according to the twelfth example embodiment. FIG. 53 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 50, the optical imaging lens 12 of the present embodiment, in an order from an object side A1 to an image side A2 along an optical axis, may comprise a first lens element 1210, a second lens element 1220, a third lens element 1230, an aperture stop 1200, a fourth lens element 1240 and a fifth lens element 1250.

The differences between the twelfth embodiment and the first embodiment include the radius of curvature and thickness of each lens element, the distance of each air gap, aspherical data, related optical parameters, such as back focal length, and the configuration of the concave/convex shape of the object-side surface 1221; but the configuration of the concave/convex shape of surfaces, comprising the object-side surfaces 1211, 1231, 1241, 1251 facing to the object side A1 and the image-side surfaces 1212, 1222, 1232, 1242, 1252 facing to the image side A2, are similar to those in the first embodiment, and the fourth lens element 1240 has positive refracting power. Specifically, the difference of the concave/convex shape of the object-side surface 1221 of the second lens element 1220 is that the object-side surface 1221 comprises a concave portion 12212 in a vicinity of a periphery of the second lens element 1220. Please refer to FIG. 52 for the optical characteristics of each lens elements in the optical imaging lens 12 of the present embodiment, please refer to FIG. 54B for the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of the present embodiment. The distance from the object-side surface 1211 of the first lens element 1210 to the image plane 1270 along the optical axis may be about 11.399 mm, the image height may be about 1.348 mm, EFL may be about 0.767 mm, HFOV may be about 103.5 degrees, and Fno may be about 2.45.

As illustrated by the longitudinal spherical aberration shown in FIG. 51(a), the offset of the off-axis light relative to the image point may be within about ±0.025 mm. As illustrated by the astigmatism aberration in the sagittal direction shown in FIG. 51(b), the focus variation with respect to the three wavelengths in the whole field may fall within about ±0.04 mm. As illustrated by the astigmatism aberration in the tangential direction shown in FIG. 51(c), the focus variation with respect to the three wavelengths in the whole field may fall within about ±0.08 mm. As shown in FIG. 51(d), the variation of the distortion aberration may be within about ±80%.

Compared with the first embodiment, the longitudinal spherical aberration and the astigmatism aberrations both in the sagittal and tangential directions of the optical imaging lens 12 may be less. According to the value of the aberrations, it is shown that the optical imaging lens 12 of the present embodiment, with the length as short as about 11.399 mm and HFOV as large as about 103.5 degrees, is capable to provide good imaging quality as well as good optical characteristics.

Please refer to FIGS. 54A and 54B, which show the values of T1, G1, T2, G2, T3, G3, T4, G4, T5, G5F, TF, GFP, EFL, TL, ALT, Gaa, TTL, Gaa/(T4+T1), (T5+T3)/T4, TL/(T4+G3), G2/(T4+G3), (G1+T3)/G2, ALT/(T5+G3), TTL/(T5+G3), T2/T4, T5/T3, TL/(T5+G3), (T1+G2)/G1, G1/T1, TL/(G1+T5), ALT/(G1+T5), ALT/(T4+G3), TTL/(T4+G3), TTL/(G1+T5), T2/T5, (T5+G3)/G2, (T5+G2)/T4 and ALT/T4 of all twelve embodiments, and it is clear that the optical imaging lens of the present disclosure satisfy the inequality (1) and/or inequalities (2), (3), (4), (5), (6), (7), (8), (9), (10), (11), (12), (13), (14), (15), (16), (17), (18), (19), (20) and/or (21).

According to above illustration, the longitudinal spherical aberration, astigmatism aberration both in the sagittal direction and tangential direction and distortion aberration in all embodiments are meet user term of a related product in the market. The off-axis light with respect to five different wavelengths (470 nm, 510 nm, 555 nm, 610 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of the first, second, third, fourth and fifth lens elements having refracting power, an object-side surface facing toward the object side and an image-side surface facing toward the image side and a central thickness defined along the optical axis, wherein:
   the first lens element has negative refracting power;
   the second lens element has negative refracting power;
   the object-side surface of the third lens element comprises a concave portion in a vicinity of a periphery of the third lens element;
   the image-side surface of the third lens element comprises a convex portion in a vicinity of the optical axis;
   the object-side surface of the fourth lens element comprises a convex portion in a vicinity of a periphery of the fourth lens element and the image-side surface of the fourth lens element comprises a concave portion in a vicinity of the optical axis;
   the fifth lens element is constructed by plastic material;
   the optical imaging lens comprises no other lenses having refracting power beyond the five lens elements; and
   a sum of all four air gaps from the first lens element to the fifth lens element along the optical axis is represented by Gaa, the central thickness of the fourth lens element is represented by T4, the central thickness of the first lens element is represented by T1, and Gaa, T4 and T1 satisfy the inequality:

$Gaa/(T4+T1) \leq 1.5$.

2. The optical imaging lens according to claim 1, wherein the central thickness of the fifth lens element is represented by T5, the central thickness of the third lens element is represented by T3, and T5, T3 and T4 satisfy the inequality:

$(T5+T3)/T4 \leq 6.2$.

3. The optical imaging lens according to claim 1, wherein a distance between the object-side surface of the first lens element and the image-side surface of the fifth lens element along the optical axis is represented by TL, an air gap between the third lens element and the fourth lens element along the optical axis is represented by G3, and TL, T4 and G3 satisfy the inequality:

$TL/(T4+G3) \leq 13.8$.

4. The optical imaging lens according to claim 1, wherein an air gap between the second lens element and the third lens element along the optical axis is represented by G2, an air gap between the third lens element and the fourth lens element along the optical axis is represented by G3, and G2, T4 and G3 satisfy the inequality:

$G2/(T4+G3) \leq 1.7$.

5. The optical imaging lens according to claim 1, wherein an air gap between the first lens element and the second lens element along the optical axis is represented by G1, the central thickness of the third lens element is represented by T3, an air gap between the second lens element and the third lens element along the optical axis is represented by G2, and G1, T3 and G2 satisfy the inequality:

$(G1+T3)/G2 \geq 2.8$.

6. The optical imaging lens according to claim 1, wherein a sum of the central thicknesses of all five lens elements is represented by ALT, the central thickness of the fifth lens element is represented by T5, an air gap between the third lens element and the fourth lens element along the optical axis is represented by G3, and ALT, T5 and G3 satisfy the inequality:

$ALT/(T5+G3) \leq 5$.

7. The optical imaging lens according to claim 1, wherein a distance between the object-side surface of the first lens element and an image plane along the optical axis is represented by TTL, the central thickness of the fifth lens element is represented by T5, an air gap between the third lens element and the fourth lens element along the optical axis is represented by G3, and TTL, T5 and G3 satisfy the inequality:

$TTL/(T5+G3) \leq 8.5$.

8. The optical imaging lens according to claim 1, wherein the central thickness of the second lens element is represented by T2, and T2 and T4 satisfy the inequality:

$T2/T \leq 2.2$.

9. The optical imaging lens according to claim 1, wherein the central thickness of the fifth lens element is represented by T5, the central thickness of the third lens element is represented by T3, and T5 and T3 satisfy the inequality:

$T5/T3 \geq 0.7$.

10. The optical imaging lens according to claim 1, wherein a distance between the object-side surface of the first lens element and the image-side surface of the fifth lens element along the optical axis is represented by TL, the central thickness of the fifth lens element is represented by T5, an air gap between the third lens element and the fourth lens element along the optical axis is represented by G3, and TL, T5 and G3 satisfy the inequality:

$TL/(T5+G3) \leq 6.8$.

11. The optical imaging lens according to claim 1, wherein an air gap between the second lens element and the third lens element along the optical axis is represented by G2, an air gap between the first lens element and the second lens element along the optical axis is represented by G1, and T1, G2 and G1 satisfy the inequality:

$(T1+G2)/G1 \leq 2$.

12. The optical imaging lens according to claim 1, wherein an air gap between the first lens element and the second lens element along the optical axis is represented by G1, and G1 and T1 satisfy the inequality:

$G1/T1 \geq 0.8$.

13. The optical imaging lens according to claim 1, wherein a distance between the object-side surface of the first lens element and the image-side surface of the fifth lens element along the optical axis is represented by TL, an air gap between the first lens element and the second lens element along the optical axis is represented by G1, the central thickness of the fifth lens element is represented by T5, and TL, G1 and T5 satisfy the inequality:

$TL/(G1+T5) \leq 3.3$.

14. The optical imaging lens according to claim 1, wherein a sum of the central thicknesses of all five lens elements is represented by ALT, an air gap between the first lens element and the second lens element along the optical axis is represented by G1, the central thickness of the fifth lens element is represented by T5, and ALT, G1 and T5 satisfy the inequality:

$ALT/(G1+T5) \leq 2.2$.

15. The optical imaging lens according to claim 1, wherein a sum of the central thicknesses of all five lens elements is represented by ALT, an air gap between the third lens element and the fourth lens element along the optical axis is represented by G3, and ALT, T4 and G3 satisfy the inequality:

$ALT/(T4+G3) \leq 9.2$.

16. The optical imaging lens according to claim 1, wherein a distance between the object-side surface of the first lens element and an image plane along the optical axis is represented by TTL, an air gap between the third lens element and the fourth lens element along the optical axis is represented by G3, and TTL, T4 and G3 satisfy the inequality:

$TTL/(T4+G3) \leq 16$.

17. The optical imaging lens according to claim 1, wherein a distance between the object-side surface of the first lens element and an image plane along the optical axis is represented by TTL, an air gap between the first lens element and the second lens element along the optical axis is represented by G1, the central thickness of the fifth lens element is represented by T5, and TTL, G1 and T5 satisfy the inequality:

$TTL/(G1+T5) \leq 3.8$.

18. The optical imaging lens according to claim 1, wherein the central thickness of the second lens element is represented by T2, the central thickness of the fifth lens element is represented by T5, and T2 and T5 satisfy the inequality:

$T2/T5 \leq 1$.

19. The optical imaging lens according to claim 1, wherein the central thickness of the fifth lens element is represented by T5, an air gap between the third lens element and the fourth lens element along the optical axis is represented by G3, an air gap between the second lens element and the third lens element along the optical axis is represented by G2, and T5, G3 and G2 satisfy the inequality:

$(T5+G3)/G2 \geq 1.5$.

20. The optical imaging lens according to claim 1, wherein the central thickness of the fifth lens element is represented by T5, an air gap between the second lens element and the third lens element along the optical axis is represented by G2, and T5, G2 and T4 satisfy the inequality:

$(T5+G2)/T4 \leq 5.5$.

21. An optical imaging lens, sequentially from an object side to an image side along an optical axis, comprising first, second, third, fourth and fifth lens elements, each of the first, second, third, fourth and fifth lens elements having refracting power, an object-side surface facing toward the object side and an image-side surface facing toward the image side and a central thickness defined along the optical axis, wherein:
the first lens element has negative refracting power;
the second lens element has negative refracting power;
the object-side surface of the third lens element comprises a concave portion in a vicinity of a periphery of the third lens element;
the image-side surface of the third lens element comprises a convex portion in a vicinity of the optical axis;
the image-side surface of the fourth lens element comprises a concave portion in a vicinity of the optical axis;
the fifth lens element is constructed by plastic material;
the optical imaging lens comprises no other lenses having refracting power beyond the five lens elements;

a sum of all four air gaps from the first lens element to the fifth lens element along the optical axis is represented by Gaa, the central thickness of the fourth lens element is represented by T4, the central thickness of the first lens element is represented by T1, and Gaa, T4 and T1 satisfy the inequality:

$Gaa/(T4+T1) \leq 1.5$; and the central thickness of the fifth lens element is greater than the central thickness of the second lens element.

* * * * *